(12) United States Patent
Mohr

(10) Patent No.: US 12,642,261 B1
(45) Date of Patent: Jun. 2, 2026

(54) PLANER BOARD WITH MOVABLE KEEL

(71) Applicant: John Mohr Enterprises LLC, Slinger, WI (US)

(72) Inventor: John Phillip Mohr, Slinger, WI (US)

(73) Assignee: John Mohr Enterprises LLC, Slinger, WI (US)

( * ) Notice: Subject to any disclaimer, the term of this patent is extended or adjusted under 35 U.S.C. 154(b) by 109 days.

(21) Appl. No.: 18/202,848

(22) Filed: May 26, 2023

Related U.S. Application Data

(60) Provisional application No. 63/348,780, filed on Jun. 3, 2022.

(51) Int. Cl.
 *A01K 91/08* (2006.01)
 *A01K 97/12* (2006.01)

(52) U.S. Cl.
 CPC .............. *A01K 91/08* (2013.01); *A01K 97/12* (2013.01)

(58) Field of Classification Search
 CPC ....... A01K 91/08; A01K 97/12; A01K 97/125
 USPC ........................... 43/43.13, 43.12, 17, 15, 16
 See application file for complete search history.

(56) References Cited

U.S. PATENT DOCUMENTS

| | | | |
|---|---|---|---|
| 542,917 A * | 7/1895 | Bardsley ................ | A01K 91/10 43/15 |
| 751,734 A * | 2/1904 | Hymers ................. | A01K 91/10 43/15 |
| 885,627 A * | 4/1908 | Loehr .................. | A01K 97/125 43/17 |
| 1,606,240 A * | 11/1926 | Klaserner .............. | A01K 93/00 43/43.13 |
| 2,220,302 A | 11/1940 | Thorne | |
| 2,542,347 A * | 2/1951 | Muller .................. | A01K 91/08 43/43.13 |
| 2,572,427 A * | 10/1951 | Anglim ................. | A01K 91/08 43/43.13 |
| 2,597,288 A * | 5/1952 | Caldwell .............. | A01K 93/00 43/43.12 |
| 2,648,929 A * | 8/1953 | Dunn .................... | A01K 91/06 43/43.13 |
| 2,726,470 A * | 12/1955 | Bass ..................... | A01K 93/02 43/15 |
| 2,769,271 A * | 11/1956 | Smith ................... | A01K 85/10 43/42.35 |
| 2,801,487 A * | 8/1957 | Morgan ................ | A01K 91/10 43/15 |

(Continued)

FOREIGN PATENT DOCUMENTS

| | | | |
|---|---|---|---|
| DE | 9215387 | U1 * | 2/1993 |
| JP | 2686732 | B2 * | 12/1997 |

*Primary Examiner* — Darren W Ark
(74) *Attorney, Agent, or Firm* — Brannen Law Office, LLC

(57) ABSTRACT

The planer board has a keel that is operatively movable with respect to a hull. The keel assembly can be in a first (lower) position where the keel extends below the bottom of the hull or in a second (upper) position retracted into the hull. A sign can extend upwards from the hull when the keel assembly is in the upper position. A rear lock assembly with a line lock is provided. A front lock assembly with two line locks can be provided. A tensioner can selectably adjust the amount of line tension required (threshold force) to release the keel to be able to retract. A keel spring is provided to force the keel to retract when a retraction is activated. A keel pin and associated keel pin spring operatively connects the front lock assembly and rear lock assembly.

24 Claims, 24 Drawing Sheets

(56) References Cited

U.S. PATENT DOCUMENTS

| | | | | |
|---|---|---|---|---|
| 2,818,671 A * | 1/1958 | Crouch | A01K 93/02 | 43/15 |
| 2,825,994 A * | 3/1958 | Bruhn | A01K 91/08 | 43/43.13 |
| 2,862,326 A * | 12/1958 | Minera | A01K 91/06 | 43/43.13 |
| 2,876,578 A * | 3/1959 | Argenio | A01K 93/02 | D22/148 |
| 2,883,787 A * | 4/1959 | George | A01K 85/16 | 43/42.22 |
| 2,891,345 A * | 6/1959 | Uhlen | A01K 91/08 | 43/43.13 |
| 2,901,857 A * | 9/1959 | Lockert | A01K 93/00 | 43/43.13 |
| 2,923,085 A * | 2/1960 | George | A01K 91/08 | 43/43.13 |
| 2,933,848 A * | 4/1960 | Tollefson | A01K 91/08 | 43/43.13 |
| 2,965,998 A * | 12/1960 | Kuismi | A01K 91/08 | 43/43.13 |
| 2,977,709 A * | 4/1961 | Keiter | A01K 91/08 | 43/43.13 |
| 2,995,852 A * | 8/1961 | Szillage | A01K 91/10 | 43/15 |
| 3,044,208 A * | 7/1962 | Minera | A01K 91/06 | 43/43.13 |
| 3,060,615 A * | 10/1962 | Spets | A01K 91/10 | 43/15 |
| 3,181,266 A * | 5/1965 | Lenfvenius | A01K 91/06 | 43/43.13 |
| 3,314,185 A * | 4/1967 | McCoy | A01K 91/10 | 43/15 |
| 3,643,370 A * | 2/1972 | Cook | A01K 95/00 | 43/43.12 |
| 3,818,624 A * | 6/1974 | Duffy | A01K 91/08 | 43/43.13 |
| 3,897,648 A * | 8/1975 | Neary | A01K 91/08 | 43/43.12 |
| 3,898,759 A * | 8/1975 | Jensen | A01K 91/08 | 43/43.13 |
| 3,908,300 A * | 9/1975 | Kuismi | A01K 91/08 | 43/43.13 |
| 3,940,872 A * | 3/1976 | Weber | A01K 91/08 | 43/43.13 |
| 4,282,672 A * | 8/1981 | Neary | A01K 91/08 | 43/43.13 |
| 4,581,842 A * | 4/1986 | Kalberer | A01K 91/08 | 43/43.13 |
| 4,745,702 A * | 5/1988 | Koch | A01K 91/08 | 43/43.13 |
| 4,894,946 A | 1/1990 | Fukushima | | |
| 5,005,310 A * | 4/1991 | Rinehart | A01K 93/02 | 43/44.88 |
| 5,018,296 A * | 5/1991 | Putz | A01K 91/08 | 43/43.12 |
| 5,068,995 A * | 12/1991 | Rinehart | A01K 91/06 | 43/17 |
| 5,255,467 A * | 10/1993 | Haskell | A01K 91/08 | 43/42.22 |
| 5,355,615 A | 10/1994 | Spickelmire | | |
| 5,636,467 A * | 6/1997 | Adams | A01K 91/08 | 43/42.22 |
| 5,826,365 A * | 10/1998 | Stroobants | A01K 91/08 | 43/4.5 |
| 5,867,932 A * | 2/1999 | Reiger | A01K 91/08 | 43/43.1 |
| 5,937,565 A * | 8/1999 | Maric | A01K 93/00 | 43/44.91 |
| 6,000,167 A | 12/1999 | Bowman | | |
| 6,055,765 A * | 5/2000 | Ruppa | A01K 91/08 | 43/43.13 |
| 6,658,784 B1 | 12/2003 | Mastropaolo | | |
| 7,380,366 B1 * | 6/2008 | Barrow | A01K 91/08 | 43/42.22 |
| 7,406,796 B1 * | 8/2008 | Koch | A01K 91/08 | 43/43.12 |
| 7,849,629 B1 * | 12/2010 | Adcock | A01K 91/10 | 43/15 |
| 8,448,375 B1 * | 5/2013 | Blankenship | A01K 91/065 | 43/26.1 |
| 9,615,561 B2 | 4/2017 | Osborn et al. | | |
| 10,368,533 B1 * | 8/2019 | Greenberg | A01K 91/08 | |
| 12,075,763 B1 * | 9/2024 | Adelman | A01K 91/08 | |
| 2002/0170226 A1 * | 11/2002 | Martinsen | A01K 91/08 | 43/43.13 |
| 2006/0207162 A1 * | 9/2006 | Pieczynski | A01K 93/02 | 43/43.13 |
| 2008/0276522 A1 * | 11/2008 | Roh | A01K 93/00 | 43/43.13 |
| 2010/0058641 A1 * | 3/2010 | Lee | A01K 93/00 | 43/17 |
| 2020/0281178 A1 * | 9/2020 | Breunig | A01K 91/08 | |
| 2021/0368760 A1 * | 12/2021 | Greenberg | A01K 91/053 | |
| 2022/0183263 A1 * | 6/2022 | Breunig | A01K 85/1803 | |
| 2023/0232800 A1 * | 7/2023 | Breunig | A01K 85/12 | 43/42.19 |

* cited by examiner

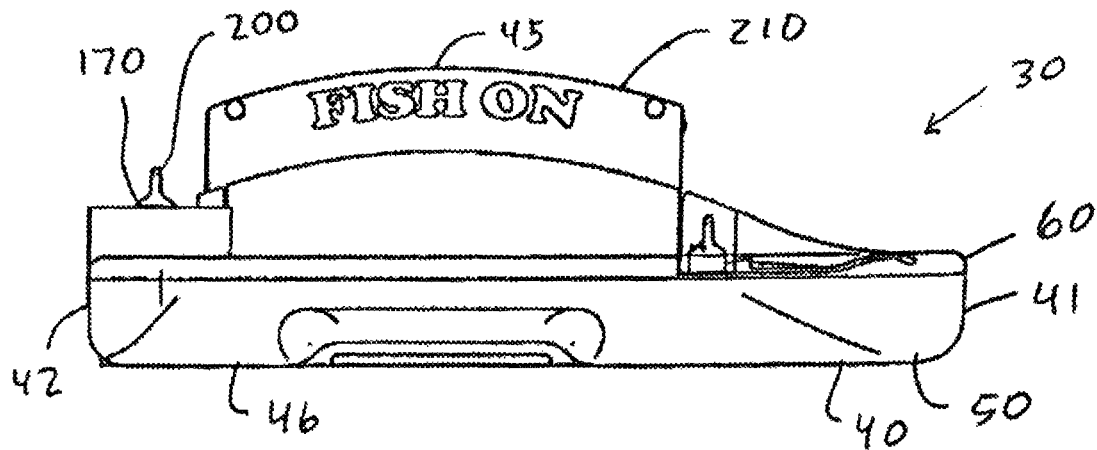
FIG. 3
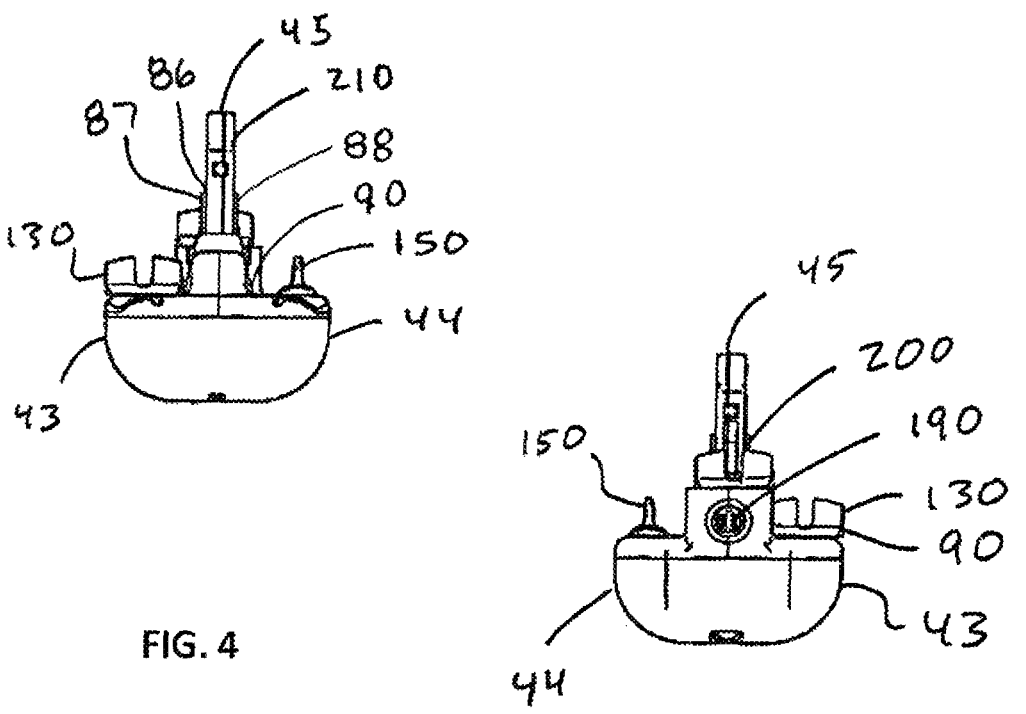
FIG. 4
FIG. 5

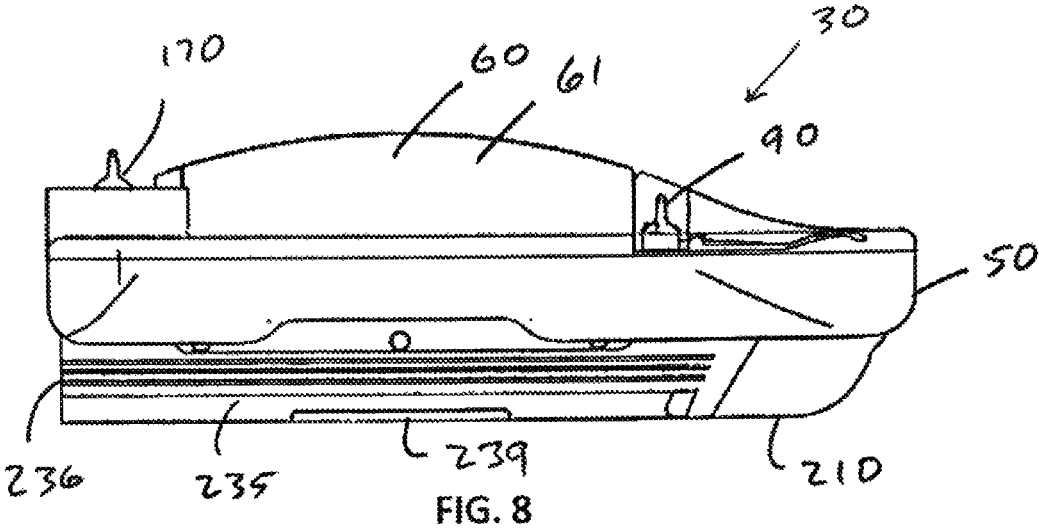
FIG. 8
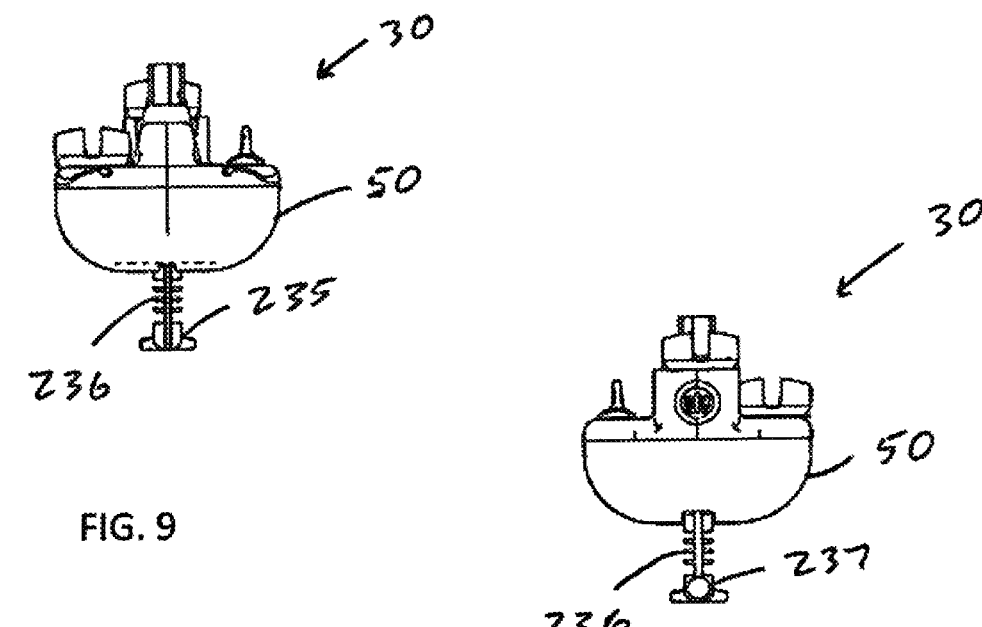
FIG. 9
FIG. 10

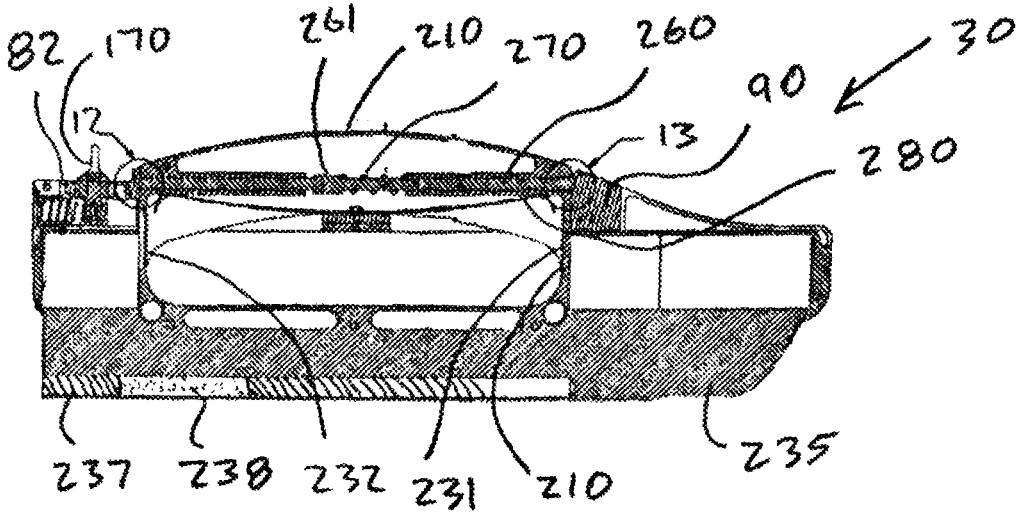
FIG. 11
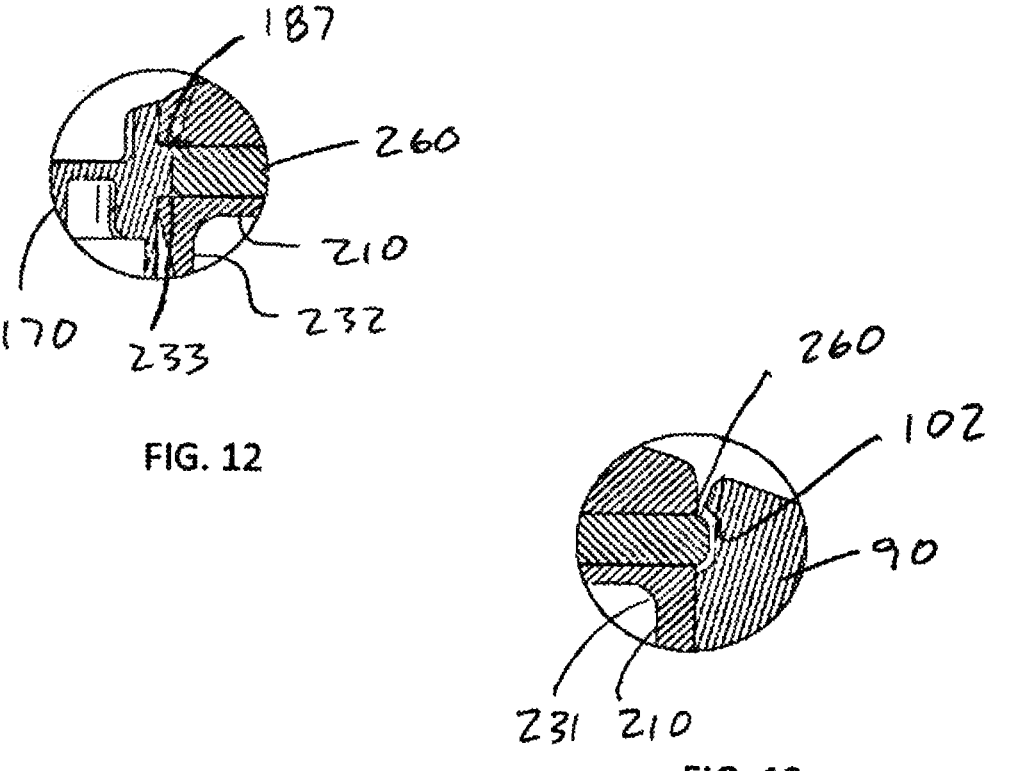
FIG. 12
FIG. 13

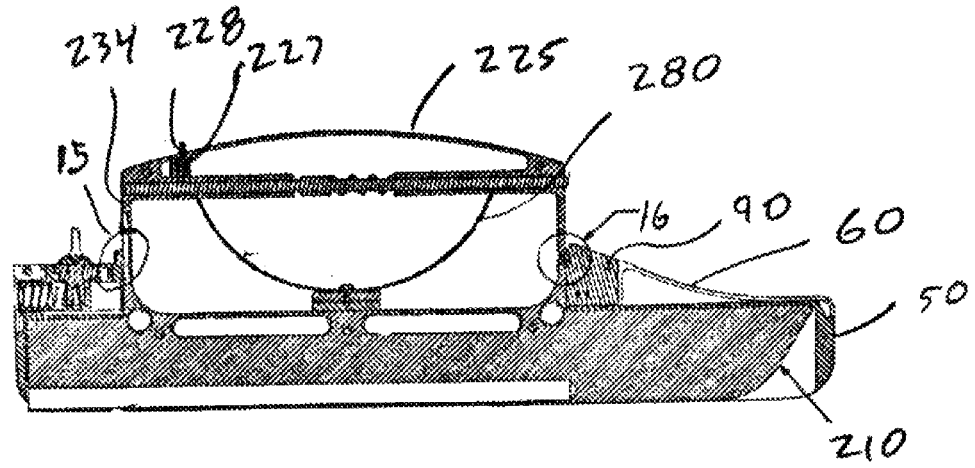
FIG. 14
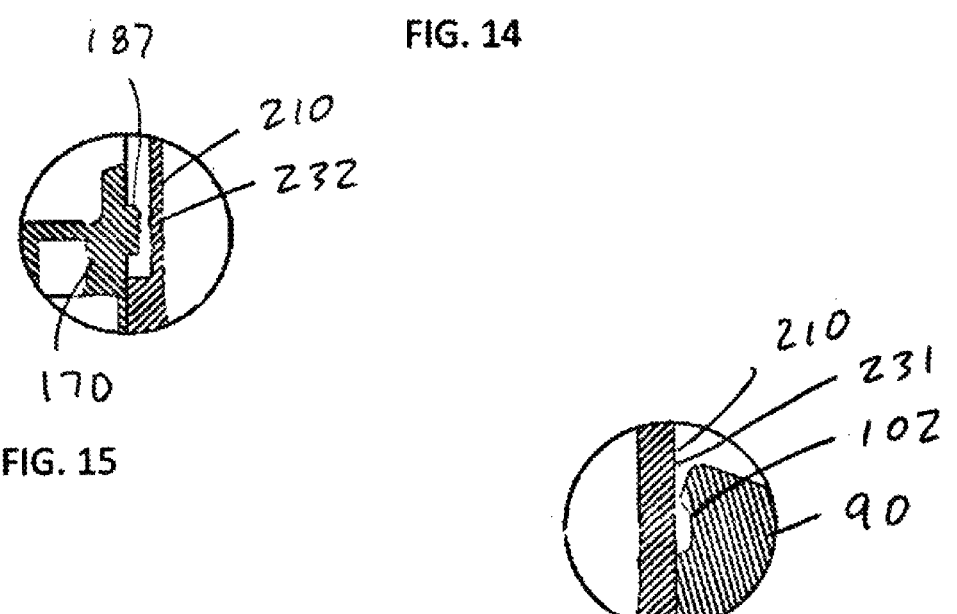
FIG. 15
FIG. 16

62

62

PLANER BOARD WITH MOVABLE KEEL

This United States utility patent application claims priority on and the benefit of provisional application 63/348,780 filed Jun. 3, 2022, the entire contents of which are hereby incorporated herein by reference.

BACKGROUND OF THE INVENTION

1. Field of the Invention

The present invention relates to a planer board, and in particular to a planer board with a movable keel.

2. Description of the Related Art

Fishing is a very popular activity. Many people troll with one or more lines 20 connected to rods on a boat 10 as it moves through the water 5. Most often, lures 21 are placed at the distal ends of lines to attract particular types of fish. Planer boards are often used when trolling so that multiple lines can be cast simultaneously.

Many types of planer boards exist. In a most basic form, a planer board allows a fisher to use a line off to the left (port side) or right (starboard side) of the boat. In practice, fishers typically troll with several lines at one time. Of the planer boards that exist, none have the unique aspects of the present invention.

In one regard, no known planer boards have a movable keel that depends from a boat when trolling, and is retracted into a planer board body when a fish is on the line.

Hence there is a need for an improved planer board, and in particular a planer board with a movable keel.

SUMMARY OF THE INVENTION

The planer board has a keel that is operatively movable with respect to a hull. The keel assembly can be in a first (lower) position where the keel extends below the bottom of the hull or in a second (upper) position retracted into the hull. A sign can extend upwards from the hull when the keel assembly is in the upper position. A rear lock assembly with a line lock is provided. A front lock assembly with two line locks can be provided. A tensioner can selectably adjust the amount of line tension required (threshold force) to release the keel to be able to retract. A keel spring is provided to force the keel to retract when a retraction is activated. A keel pin and associated keel pin spring operatively connects the front lock assembly and rear lock assembly.

There are many aspects of the present invention, which each can have unique and independent advantages, as set out in particular in the appended claims.

According to one advantage of the present invention, a keel assembly is movable between a down position and an up position. In the down position, the keel depends downward from the bottom of the hull to increase drag to spread out the planer board for trolling. When in the up position, the keel is retracted into the hull. Without increased drag, the planer board advantageously moves from the side of the boat to behind it as the boat moves forward when the keel is in the up position.

According to another advantage of the present invention, when the keel is retracted into the hull or body, the planer board is easier to pull or reel into the boat on account of the decreased drag. Also, since the planer board moves to a position that is behind the boat (due to decreased drag), it is not likely to get tangled with other trolling lines.

According to a further advantage of the present invention, the keel can have a tube at the bottom for optionally receiving a weight. This advantageously allows the dynamics of the planer board relative to the water to be tailored to a user's specifications. More specifically, the weight (which can be determined by the user) can be selectably applied forward, neutral or rearward within the tube to adjust the pitch of the planer board relative to the water.

According to a still further advantage of the present invention, the keel assembly can be triggered or activated to move from the down position to the up position when a fish engages the distal end of the fishing line. The planer board has a rear lock assembly with a rear line lock. The rear line lock engages the fishing line. The rear lock assembly is moved when a fish engages the line with a rearward (relative to the planer board) force greater than the threshold force, to advantageously allow the keel to be able to retract to the up position. This can occur when the rear lock assembly moves within the gap and allows the keel assembly lip to pass the lock assembly protrusion.

According to a still further advantage yet of the present invention, a tensioner can be operably provided with the rear lock assembly to allow the user to be able to select the threshold force required to allow the lock assembly and keel assembly to disengage. Adjusting the threshold force allows the user to be able to tailor the planer board for certain parameters, such as type or weight of fish.

According to a still further advantage yet of the present invention, the planer board can have a front lock assembly. The front lock assembly has a line lock that engages the fishing line. The lock assembly lock is moved when a user on the boat engages the line with a force greater than the threshold force, to allow the keel to be able to retract to the up position.

According to a still further advantage yet of the present invention, two front line locks can be provided so that the planer board can be used on both the port and starboard side of the boat without planer board modification or adjustment, and without the need for having multiple different units.

According to a still further advantage yet of the present invention, the two front line locks are supported by the front lock assembly housing. The front lock assembly housing is biased towards being centered with respect to the hull with centering springs and is preferably biased to be symmetrically located with respect to the planer board longitudinal axis. This allows the housing and line locks to return to position after temporarily being moved under operation of the user on the boat. A pull from the boat end of the line will have a lateral force component to it, which advantageously allows the lock assembly to be overcome the threshold force and move laterally to unlock the keel assembly.

According to a still further advantage yet of the present invention, the front and rear line locks can have dual cylinders with respective offset axis. The first cylinder is received within a lower section of a housing pocket and is rotatable up its axis. The second cylinder (offset from the first one) orbits about the first cylinder axis within an upper section of the pocket. This allows the line locks to pinch the fishing line between a sidewall and line rubber to lock it in place.

According to a still further advantage yet of the present invention, the line lock cylinders can be positioned so that a pulling force (rearward by fish or forward angled from boat) adds a rotational force to reinforce the locked position. Stated another way, the line force would act in the same direction as the rotational turning of the cylinders to lock the locks. This advantageously prevents inadvertent lock disengagement.

According to a still further advantage of the present invention, each offset cylinder piece can be limited in rotation by having a bottom of the upper cylinder contact a stop wall within the upper section to act as a rotation limit. This advantageously prevents the line locks from over-rotating to become disengaged.

According to a still further advantage yet of the present invention, the line locks can have a knob with tines that engage a line rubber. In this regard, twisting the knob causes the line rubber to similarly rotate, and to rotate with the offset cylinder to lock the line in place.

According to a still further advantage yet of the present invention, the offset cylinder can have an end with a slot. The slot engages a key in the knob bottom, whereby the dual cylinders (or dual cylinder piece) and knob rotate in unison.

According to a still further advantage yet of the present invention, the front and rear lock assemblies can act upon same release mechanism. Stated another way, two triggers (i.e. both front and rear lock assemblies) are provided for allowing the same action to operate. This is advantageously accomplished with the use of a keel pin and keel pin spring. A sufficient pulling force from the rear (i.e., a fish) overcomes the tension in the tensioner to allow rear of keel pin to force the lock protrusion or lip backwards so that the rear keel assembly lip can clear the lock lip. A sufficient pulling force from the forward angled direction (i.e., a user on the boat) to overcome threshold force moves the keel pin laterally out of a dish or detent (and accordingly the keel pint moves the lock protrusion or lip backwards so that the rear keel assembly lip can clear the lock lip at the same time). Either way, once cleared, the keel spring biases the keel assembly upward relative to the body to the up position.

According to a still further advantage yet of the present invention, when the keel assembly is in the up position, a sign is raised vertically from body. The sign can provide a visual indication of planer board status to people on the boat.

According to a further advantage of the present invention, the keel assembly can have a light pocket for receiving a light. The light can shine through the keel assembly displaying a first color when the sign is up. When the keel assembly is in the down position, the light shines through both the keel assembly and the cap sidewall, displaying a second color. Having a planer board that can display two colors, the displayed color which is dependent upon the status of the position of the keel assembly, provides a visual indication of the status to the user. This is advantageous at night as the user can easily determine the keel status based on the displayed color.

According to a still further advantage yet of the present invention, the body can have two line slots (one on each side near the forward end) adjacent the line locks. In this regard, after the keel retracts into the body and the planer board moves to the back of the boat, the line enters either the left or right line slot (depending on which side of the boat the planer board is on) so that the planer board can be directly behind the boat (on the same side as the rod is located).

According to a still further advantage yet of the present invention, the keel assembly can be easily reset by pushing or pulling down on the keel assembly relative to the body. The keel assembly rear end has a ramp, which allows the keel assembly to push the rear line lock protrusion rearward allowing the keel assembly lip to reset below the lock protrusion upon downward motion of the keel relative to the hull when the user overcomes the tensioner spring force. The front of the keel pin also resets into the dish or detent.

Other advantages, benefits, and features of the present invention will become apparent to those skilled in the art upon reading the detailed description of the invention and studying the drawings.

BRIEF DESCRIPTION OF THE DRAWINGS

FIG. 3 is a side view of the view shown in FIG. 1.

FIG. 4 is a front view of the view shown in FIG. 1.

FIG. 5 is a rear view of the view shown in FIG. 1.

FIG. 8 is a side view of the view shown in FIG. 6.

FIG. 9 is a front view of the view shown in FIG. 6.

FIG. 10 is a rear view of the view shown in FIG. 6.

FIG. 11 is a cross-sectional view taken along line 11-11 in FIG. 6.

FIG. 12 is a close-up view showing the rear end of the keel assembly in a locked position relative to a rear lock assembly.

FIG. 13 is a close-up view showing the front end of the keel pin in a locked position relative to a front lock assembly.

FIG. 14 is a cross-sectional view taken along line 14-14 in FIG. 1.

FIG. 15 is a close-up view showing the rear end of the keel assembly in an unlocked position relative to a rear lock assembly.

FIG. 16 is a close-up view showing the front end of the keel pin in an unlocked position relative to a front lock assembly.

FIG. 53 is a flow chart showing a use of the present invention.

DETAILED DESCRIPTION OF THE PREFERRED EMBODIMENTS

Figure 1:
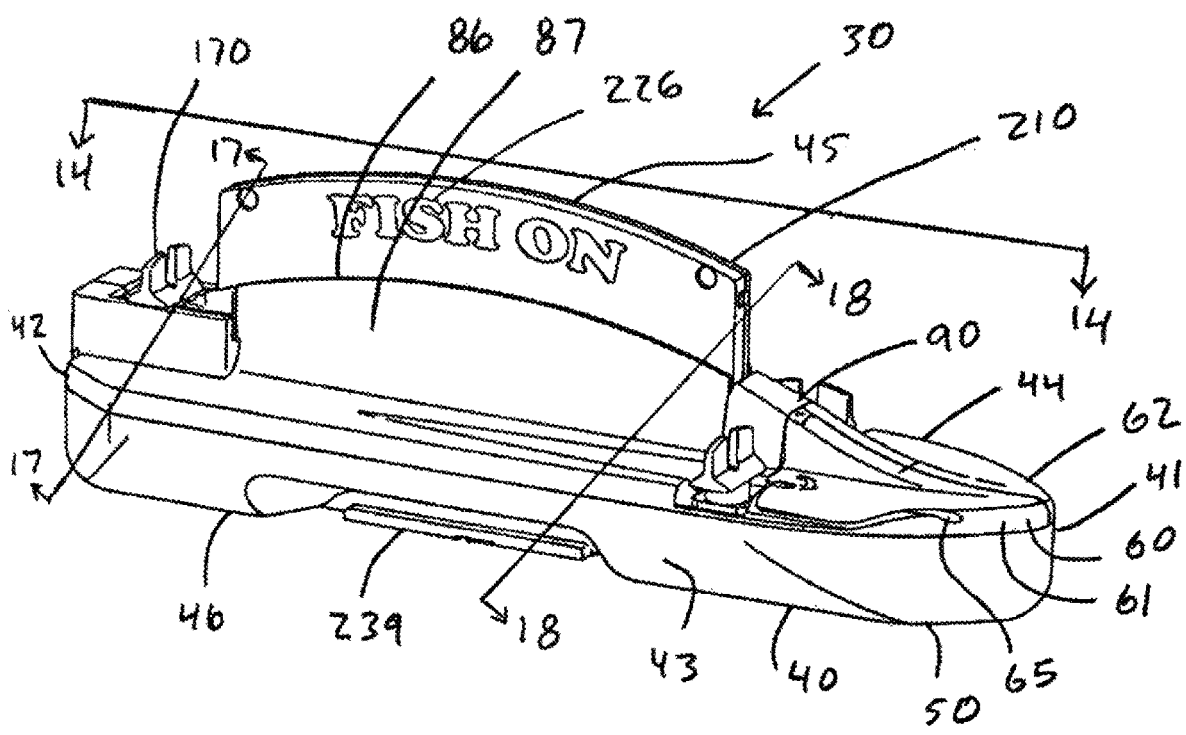
FIG. 1 is a perspective view of an embodiment of the present invention showing a keel assembly in an up position.

While the invention will be described in connection with one or more preferred embodiments, it will be understood that it is not intended to limit the invention to those embodiments. On the contrary, it is intended to cover all alternatives, modifications and equivalents as may be included within the spirit and scope of the invention as defined by the appended claims.

According to the present invention, a planer board 30 is provided. The planer board 30 is seen in FIGS. 1-10, among other figures. The planer board can have a body 40, a front lock assembly 90, a rear lock assembly 170 and a keel assembly 210. Each of these components are described below.

The keel assembly 210 can be in an up or retracted position (relative to the body 40) as seen in FIGS. 1-5 and 14-16, or in a down or extended position as seen in FIGS. 6-13.

The body 40 has a forward end 41, a rearward or aft end 42, a starboard side 43, a port side 44, a top 45 and a bottom 46. Body 40 can be formed of several pieces, namely, a hull 50 (or lower piece) and a cap 60 (preferably comprised of two cap pieces 61 and 62).

Figure 19:
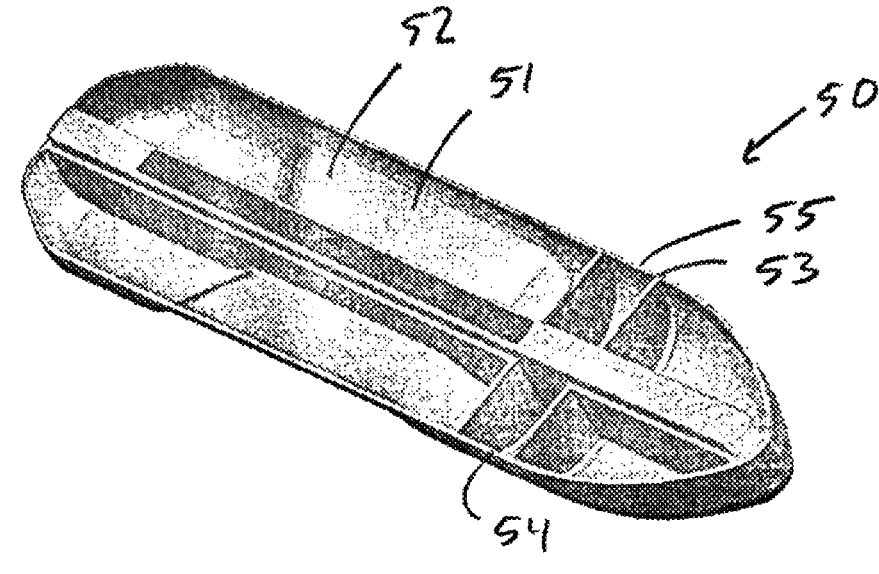
FIG. 19 is a perspective isolation view of a hull.
Figure 20:
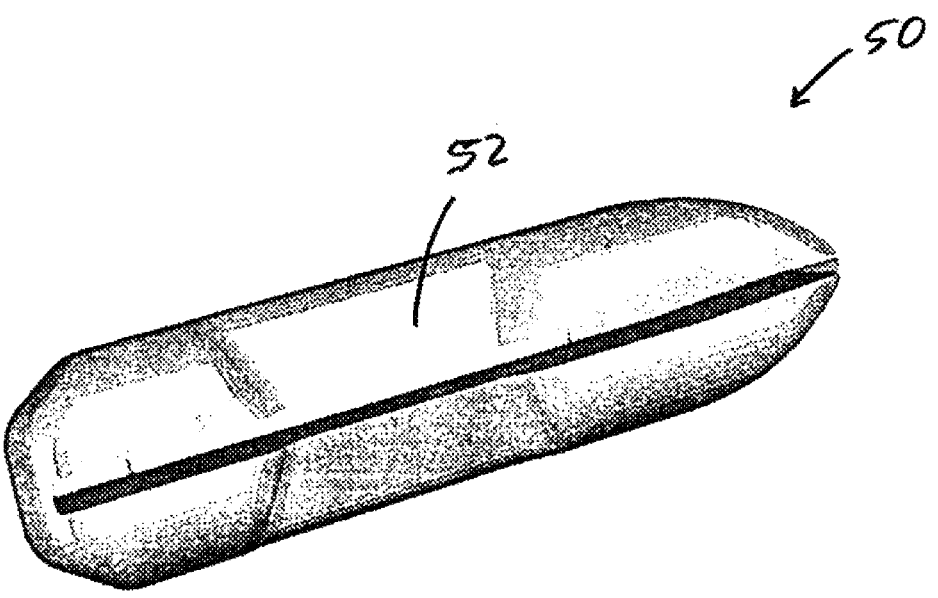
FIG. 20 is a lower perspective view of the hull.

The hull 50, as seen in isolation in FIGS. 19 and 20, has a central tunnel 51 spanning from front to rear of the lower piece 50. The tunnel 51 has an opening 52 therethrough. Opening 52 is preferably centrally located at the top of the tunnel and has an opening axis parallel with the tunnel longitudinal axis. Opening 52 allows an item to pass vertically through the tunnel 51. The hull 50 also has a front lock support 53. The lock support 53 can be defined by the central tunnel, the lower piece side walls, and two laterally oriented members (preferably parallel to each other and perpendicular to the tunnel longitudinal axis) to form two upward facing pockets 54 and 55.

Figure 2:
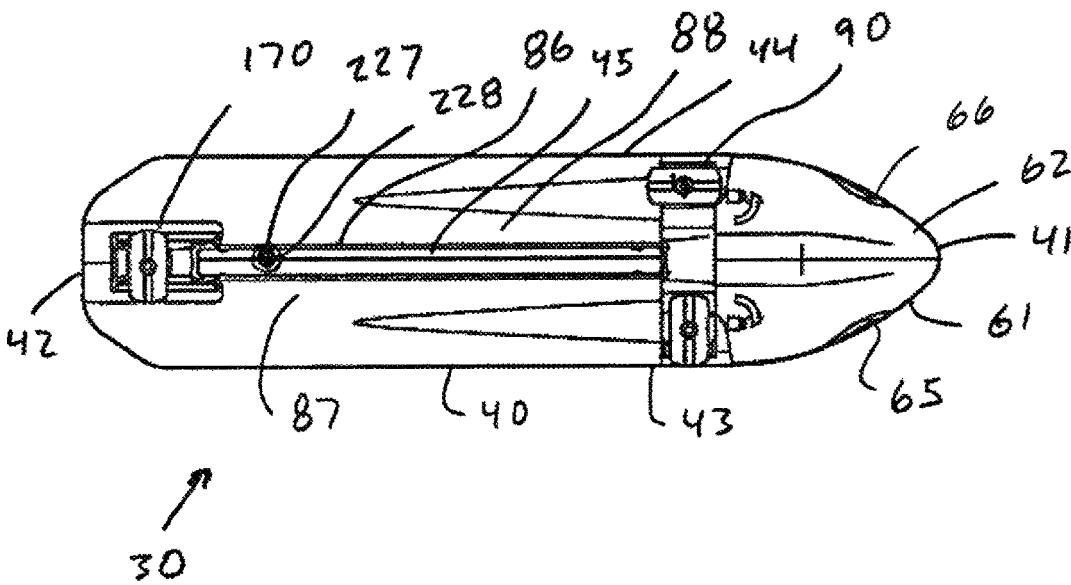
FIG. 2 is a top view of the view shown in FIG. 1.
Figure 6:
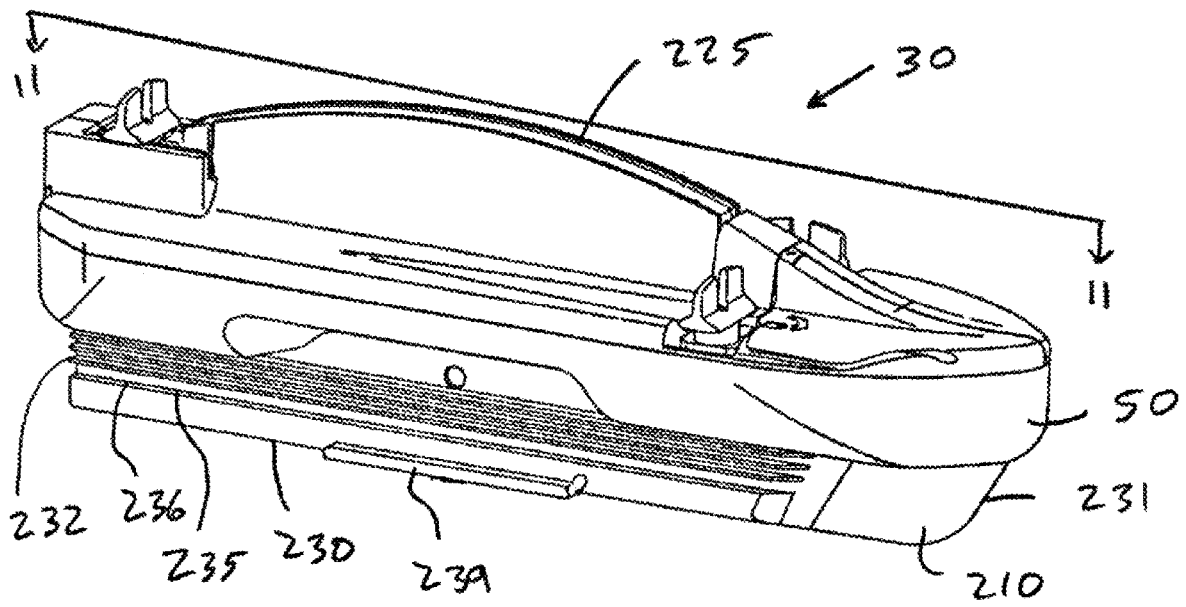
FIG. 6 is similar to FIG. 1 but shows the keel assembly in the lowered position.
Figure 7:
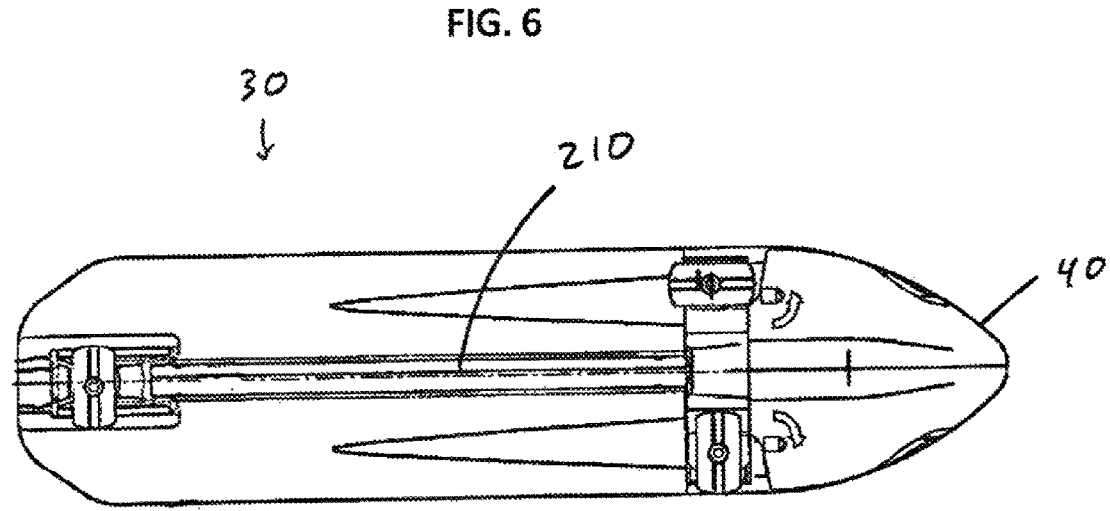
FIG. 7 is a top view of the view shown in FIG. 6.
Figure 17:
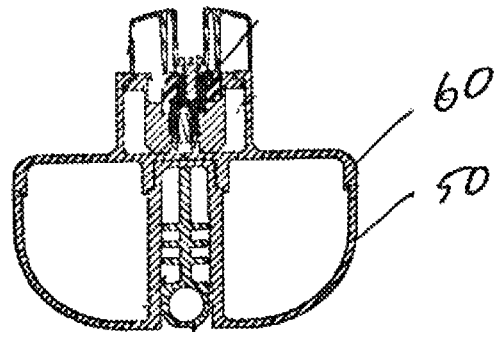
FIG. 17 is a cross-sectional view taken along line 17-17 in FIG. 1.
Figure 18:
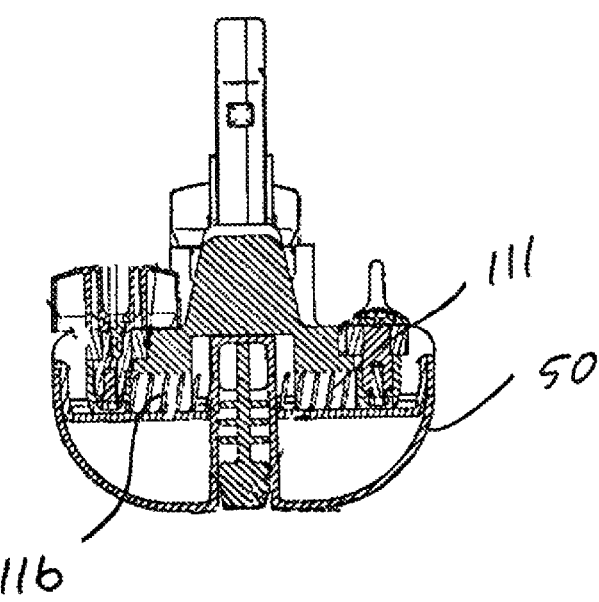
FIG. 18 is a cross-sectional view taken along line 18-18 in FIG. 1.
Figure 21:
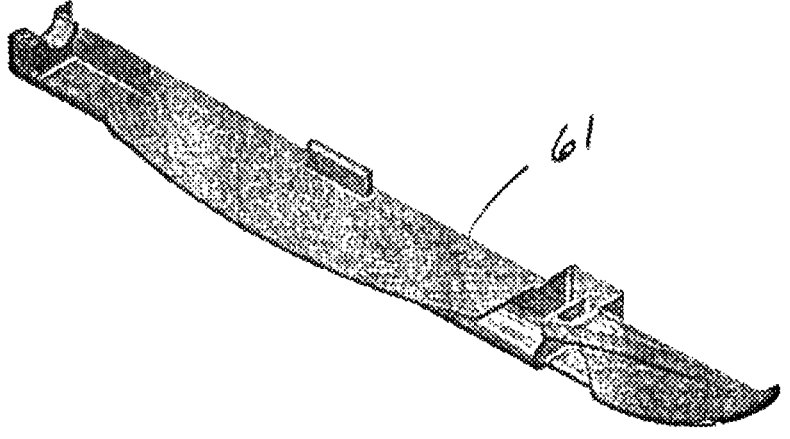
FIG. 21 is an upper perspective view of a cap first piece.
Figure 22:
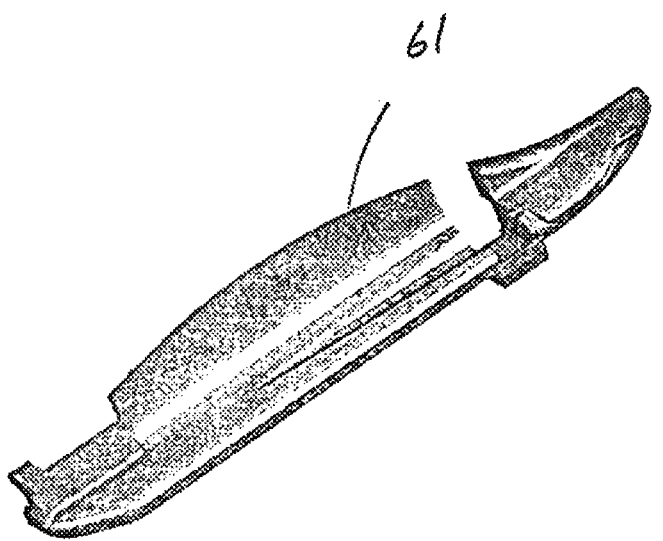
FIG. 22 is an alternative perspective view of the cap first piece.
Figure 23:
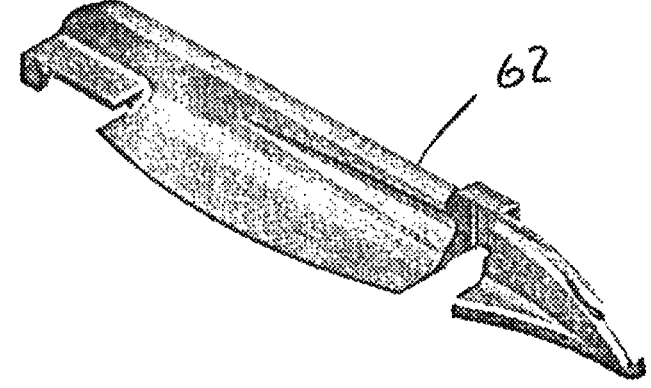
FIG. 23 is an upper perspective view of a cap second piece.
Figure 24:
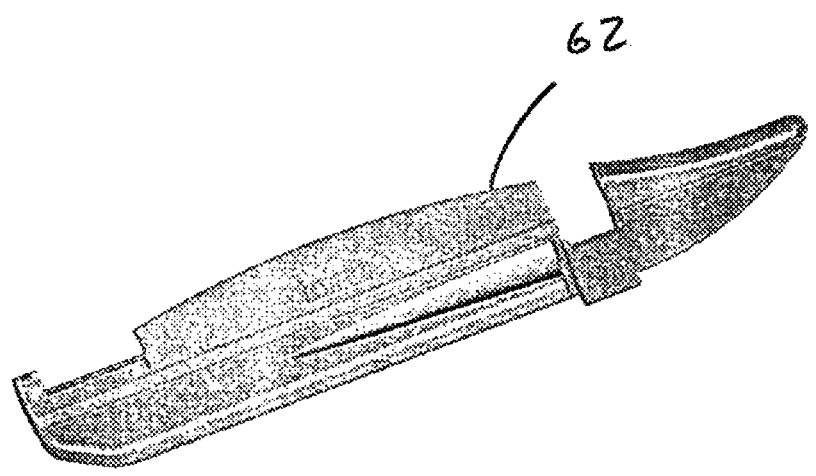
FIG. 24 is an alternative perspective view of the cap second piece.

The cap 60, as noted above, is preferably comprised of two pieces 61 and 62. Cap piece 61 is shown in isolation in FIGS. 21 and 22. Cap piece 62 is shown in isolation in FIGS. 23 and 24. The cap 60, as seen in FIGS. 1-2, has a first line slot 65 and a second line slot 66. Line slot 65 is on the starboard side 43 of the body 30 and line slot 66 is on the port side 44 of the body. A rear lock mount 80 having a cavity 81 larger than a rear lock assembly 170 (described below) to form a gap 82 when the rear lock assembly is received within the mount 80. The gap 82 has a depth dimension measured along the planer board longitudinal axis. A hole 83 is provided at the rear of joined pieces as is a retainer 84. The hole 83 preferably has a hole axis that is aligned parallel with the tunnel longitudinal axis. It is appreciated that a single upper rear piece could be used without departing from the broad aspects of the present invention. The cap 60 further has an opening 6 along its top that is formed between two sidewalls 87 and 88, respectively.

The cap 60 is preferably fastened to the body 40 in a watertight and permanent way. This will allow air to remain within the interior of the planer board 30 to maintain buoyancy during use. One preferred way is sonic welding. Another way could be with an adhesive. Other ways could be used without departing from the broad aspects of the present invention.

Turning now to FIGS. 18 and 27-31, it is seen that a preferred embodiment of a front lock assembly 90 is provided. The front lock assembly 90 has a housing 100, and two line locks 130 and 150, respectively.

The housing 100 has a riser 101 with a detent 102, a spring pocket 110 for receiving a spring 111, and a spring pocket 115 for receiving a spring 116. Spring pockets 110 and 115 are preferably horizontally opposed wherein springs 111 and 116 act upon the same force axis. The housing 100 is received within the front lock support 53 of the lower piece 50. The detent 102 preferably has two side ramps 103 and 104, and also preferably has a top ramp 105. The ramps allow an item to slide in and out of the detent without having a sharp edge to engage. A slot 117 is provided on the housing 100 that can engage with a portion of the cap 60 to retain the housing 100 in position to prevent vertical rise of the housing relative to the body 40. A pocket 120 is provided having an upper section 121 with a stop wall 122, a lower section 123 and a hole 124. The stop wall 122 preferably spans about 270 degrees. The hole 124 passes through the bottom of the pocket 120. A pocket 125 is also provided, having an upper section 126 with a stop wall 127, a lower section 128 and a hole 129. The stop wall 127 preferably spans about 270 degrees. The hole 129 passes through the bottom of the pocket 125.

Figure 32:
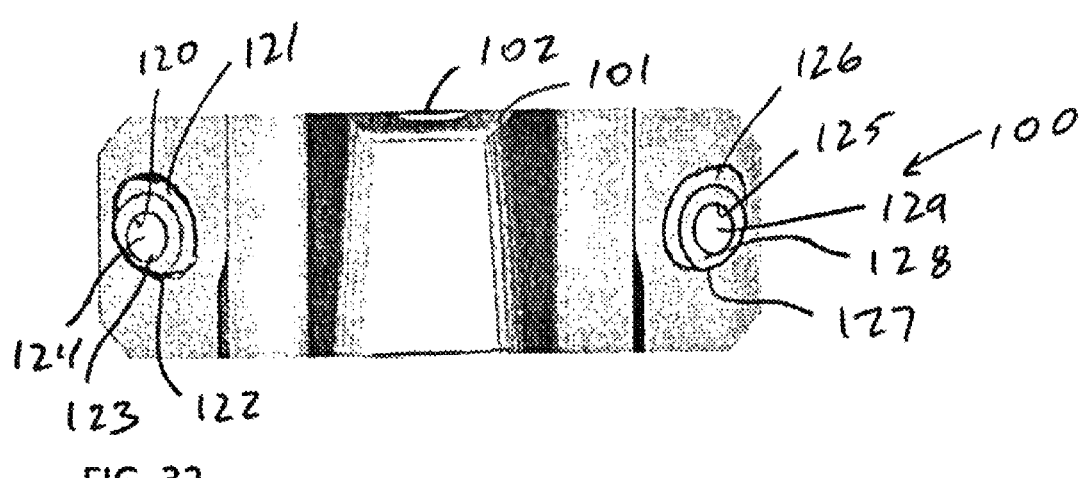
FIG. 32 is a top view of the front lock assembly housing.
Figure 33:
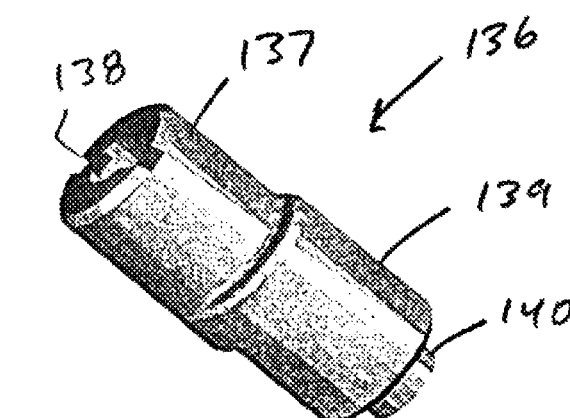
FIG. 33 is a perspective view of the offset cylinders of the lock assembly.
Figure 34:
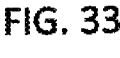
FIG. 34 is a lower perspective view of the knob of the lock assembly.
Figure 34:
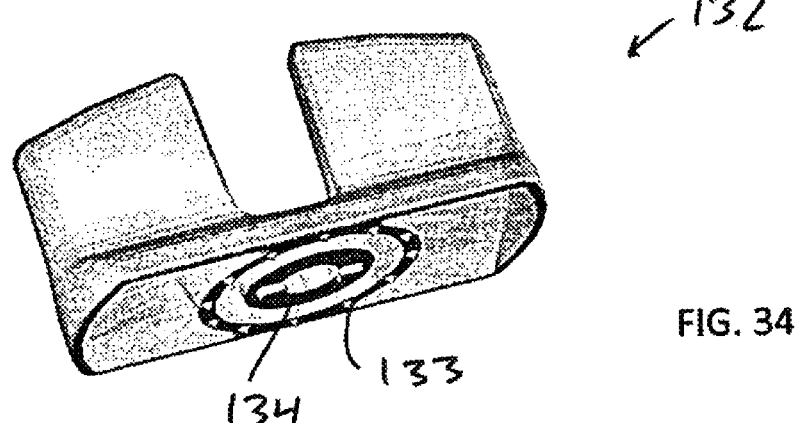
Figure 35:
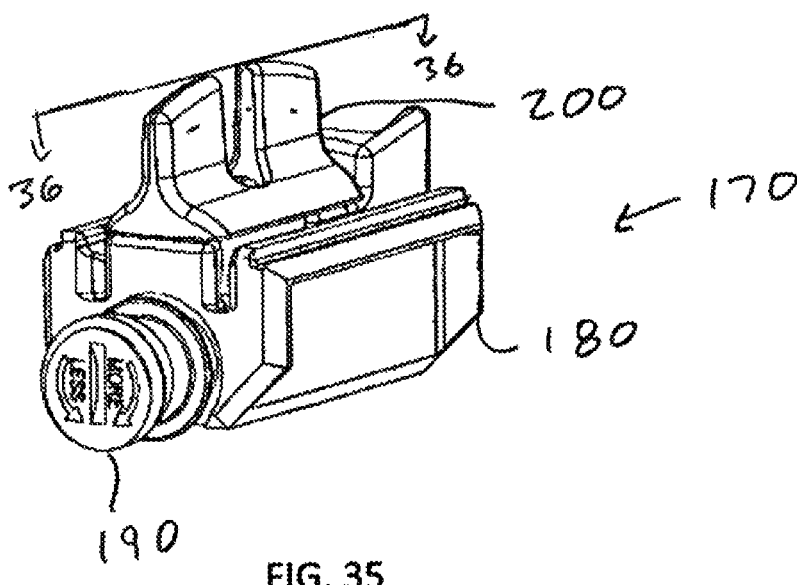
FIG. 35 is a perspective isolation view of the rear lock assembly.
Figure 36:
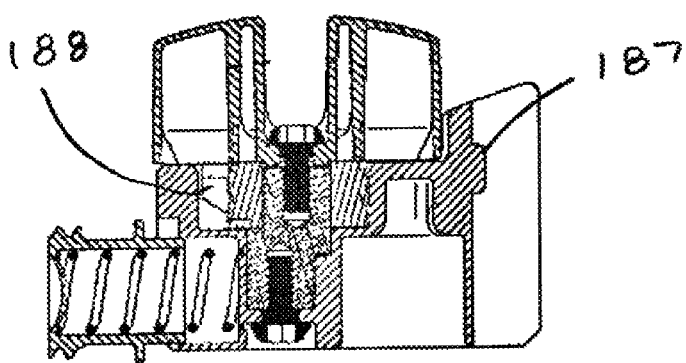
FIG. 36 is a cross-sectional view taken along line 36-36 in FIG. 35.
Figure 37:
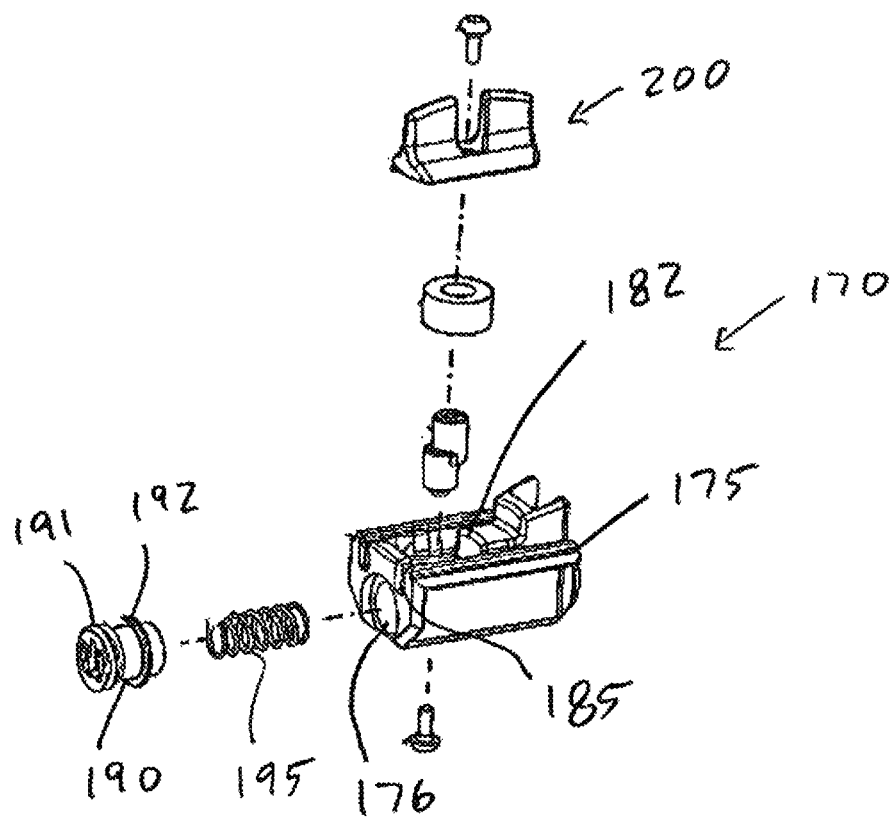
FIG. 37 is an exploded view of the rear lock assembly shown in FIG. 35.
Figure 38:
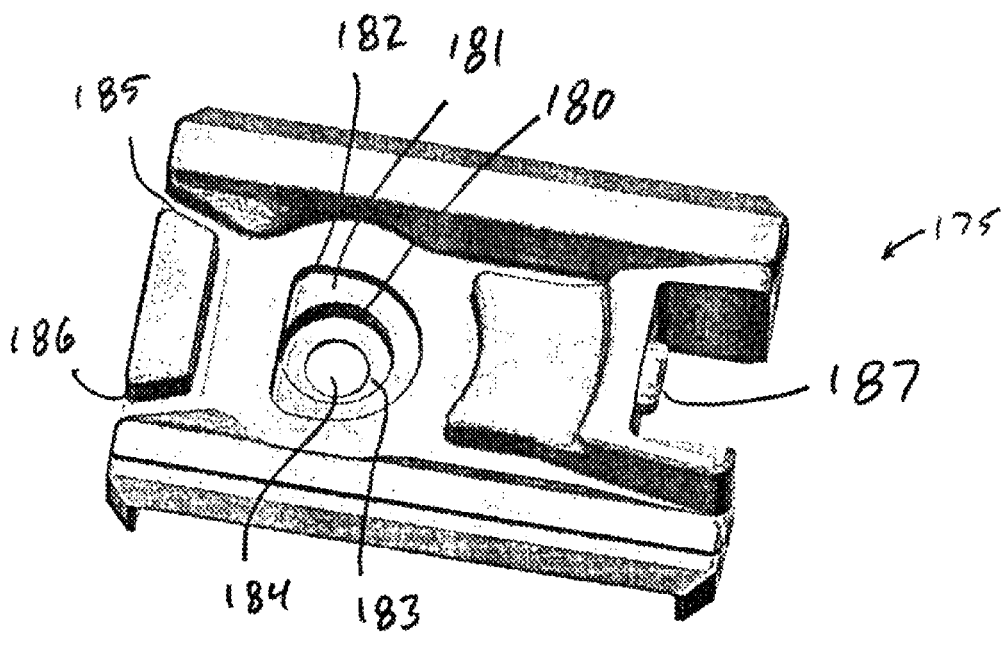
FIG. 38 is an upper perspective view of the housing of the rear lock assembly.
Figure 39:
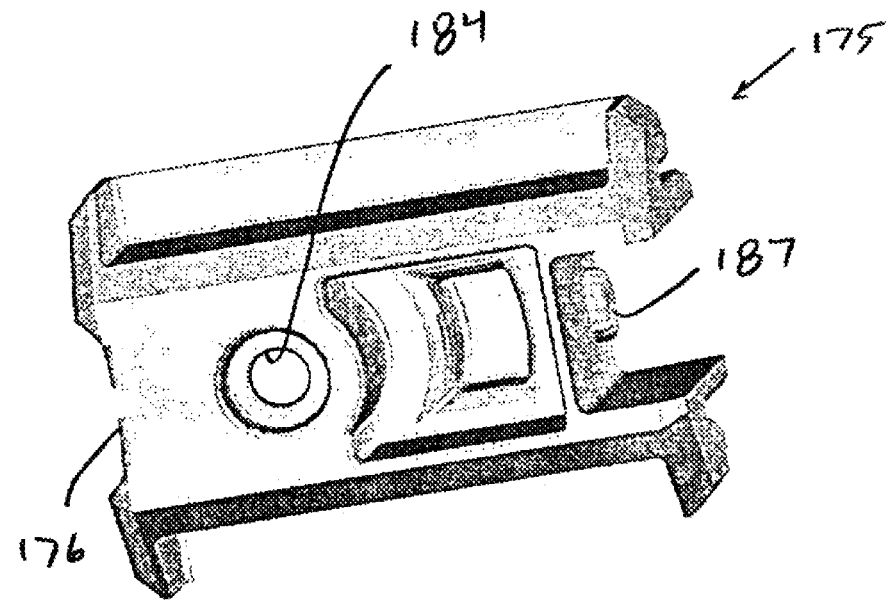
FIG. 39 is an alternative perspective view of the housing of the rear lock assembly.

Line lock 130 has a screw 131, a knob 132 (seen in isolation in FIG. 34), a line rubber 135, an offset cylinder piece 136 (seen in isolation in FIGS. 32 and 33) and a second screw 141. The knob 132, as seen in FIG. 34 has tines 133 on the bottom in a circular pattern. A key 134 is centrally aligned on the bottom along the longitudinal axis of the knob. The offset cylinders 136 has two cylinders 137 and 139. Cylinder 137 has a slot 138 at its distal end. Cylinder 139 has a ring 140 at its distal end. The offset cylinder piece accordingly has two cylinders that are joined at their respective interior ends. Cylinder 139, and in particular ring 140, is received within hole 120 and can rotate about its cylinder axis. Cylinder 137 orbits about the first cylinder axis when the first cylinder rotates within the lower section 123. Cylinder 139 can rotate within pocket 120 until the interior end of the cylinder 137 contacts the stop wall 122 as it orbits within the upper section 121 of the pocket 120. The stop wall 122 spans preferably 270 degrees limiting movement of the offset cylinder piece to 90 degrees. Screw 131 fastens the knob and line rubber 135 to one of the offset cylinders 137 of the offset cylinder piece 136. Screw 141 passes through the housing 100 via hole 124 and is received in the other offset cylinder 139 of the offset cylinder piece 136. Tines 133 engage the top of the line rubber 135, wherein these two components rotate in unison. Key 134 of the knob 132 and slot 138 of the offset cylinders 136 mate, wherein the knob 132 and offset cylinder piece 136 rotate in unison.

Line lock 150 has the same parts as line lock 130, and operates as a mirror image of line lock 130 about the longitudinal axis of the planer board. Line locks 130 and 150 have locked positions and unlocked positions. In the locked positions, knob 132 is twisted so that the line rubber 135 contacts the housing 100 and pinches a line (if present) between the rubber and the housing. In a preferred embodiment, the locks are locked when the knob is perpendicular to the planer board longitudinal axis, and unlocked when the knob is parallel to the planer board longitudinal axis. It is preferred that the direction of pulling force from the boat is in the same direction as the locking direction, whereby a pulling force reinforces the locking force provided by the knob. Lock 150 is received within pocket 125.

A preferred embodiment of a rear lock assembly 170 is seen in FIGS. 17 and 35-40, among other figures. The rear lock assembly 170 has a housing 175. The housing 175 has a rear tensioner pocket 176. The housing 175 also has a pocket 180 having an upper section 181 with a stop wall 182, a lower section 183 and a hole 184. The stop wall 182 preferably spans about 180 degrees. The hole 184 passes through the bottom of the pocket 180. The housing also has side slots 185 and 186, a lock protrusion (or lip) 187 and a space 188 (for the offset cylinder of piece 136 to move in. Side slots 185 and 186 are preferably parallel to each other. The protrusion 187 preferably projects forward from the front face of the housing.

Figures 42, 43, 44:
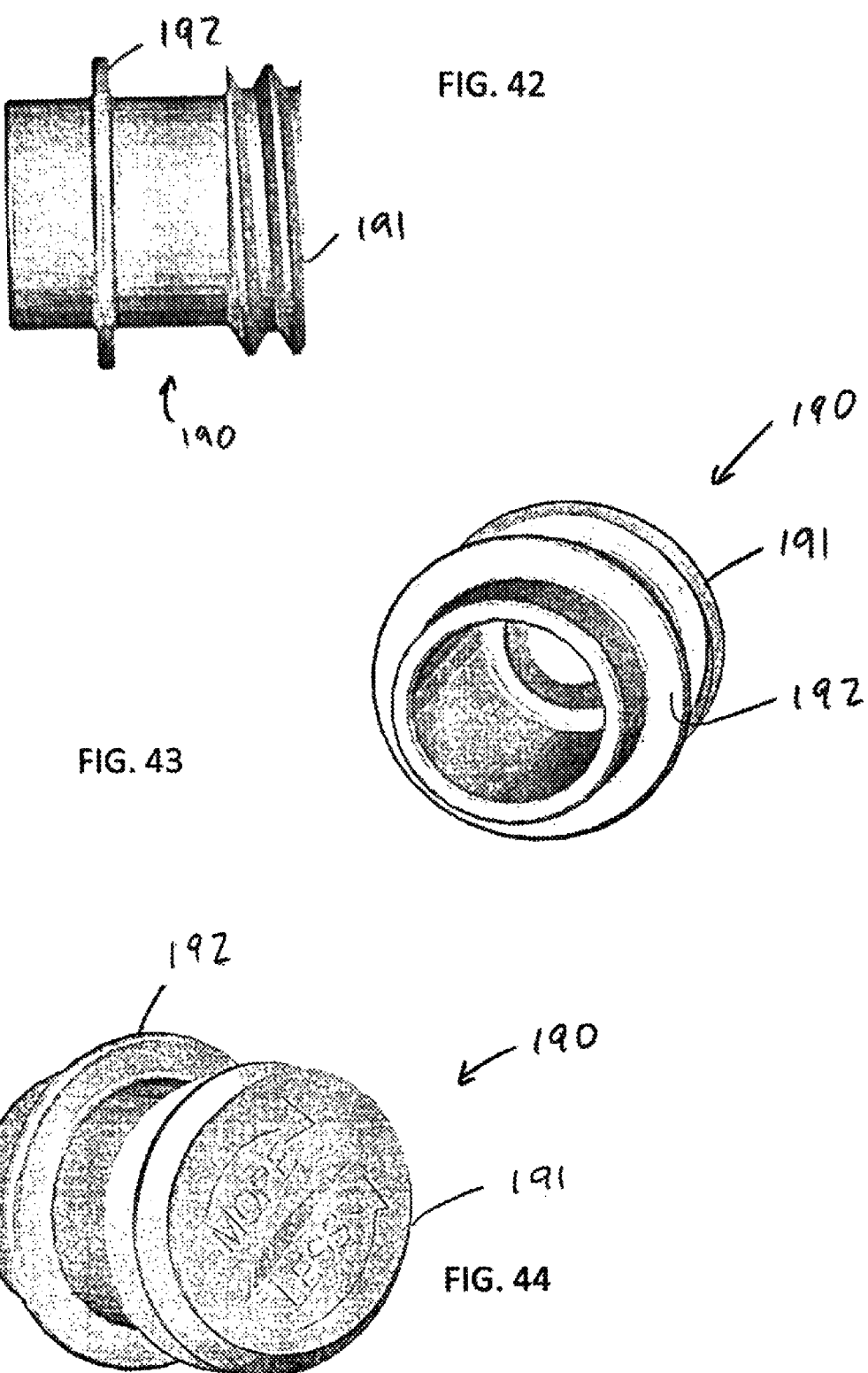
FIG. 42 is a side view of a tensioner.
FIG. 43 is a perspective view of the tensioner.
FIG. 44 is an alternative perspective view of the tensioner.

The tensioner 190 has a cap 191 and a rim 192, as seen in FIGS. 42-44. A spring 195 can be received within the tensioner 190. The tensioner 190 is received within tensioner pocket 176 of the housing 175. The cap 191 extends out from tensioner pocket 176. The cap is threaded and is threadably engaged by retainer 84 of the cap 60. Cap 191 has a slot on the outside surface that can be engaged by a tool such as a screwdriver. The tool can be used to twist the cap selectably in and out to adjust the spring force on the spring 195.

Line lock 200 preferably has the same parts as line locks 130 and 150. Lock 200 is received within pocket 180. Line lock 200 has two locked positions (left and right) and one unlocked position. In the left locked position, the knob is twisted so that the line rubber contacts the left slide slot sidewall to pinch a line (if present) between the rubber and the sidewall (and portion of top cylinder hits stop wall of the upper section). In the right locked position, the knob is twisted so that the line rubber contacts the right slide slot sidewall to pinch a line (if present) between the rubber and the sidewall (and portion of top cylinder hits stop wall of the upper section). In a preferred embodiment, the lock is locked when the knob is perpendicular to the planer board longitudinal axis (by twisting left or right, as desired), and unlocked when the knob is parallel to the planer board longitudinal axis.

Figure 25:
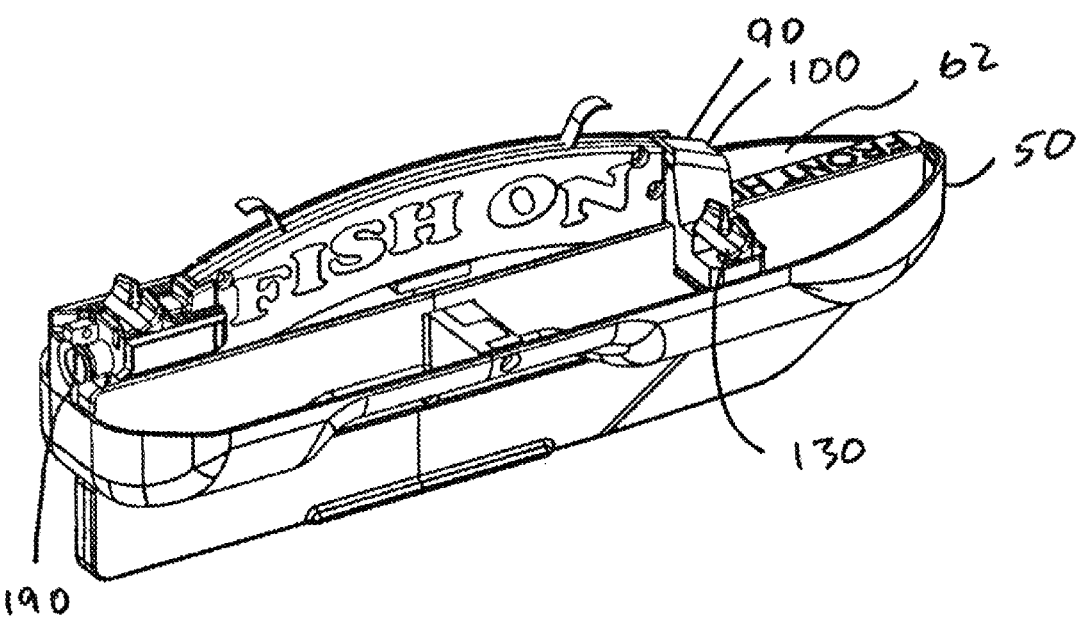
FIG. 25 is a perspective view of the present invention with one of the cap pieces removed.
Figure 26:
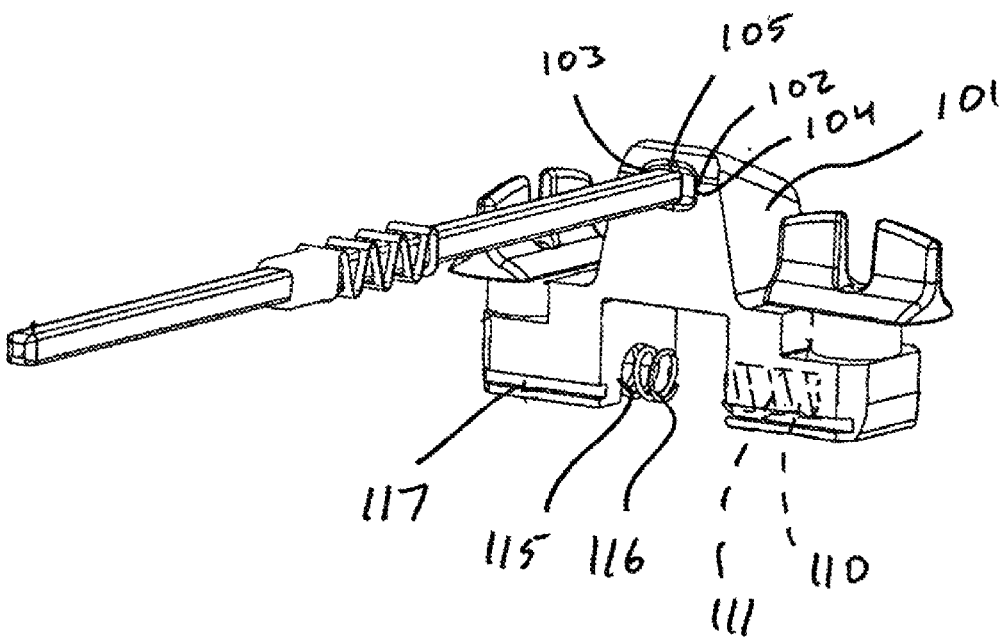
FIG. 26 is a perspective view of the front lock assembly and keel pin.
Figure 27:
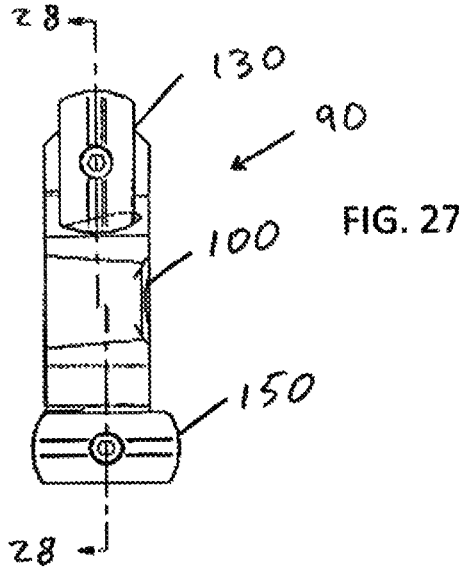
FIG. 27 is a top isolation view of the front lock assembly.
Figure 28:
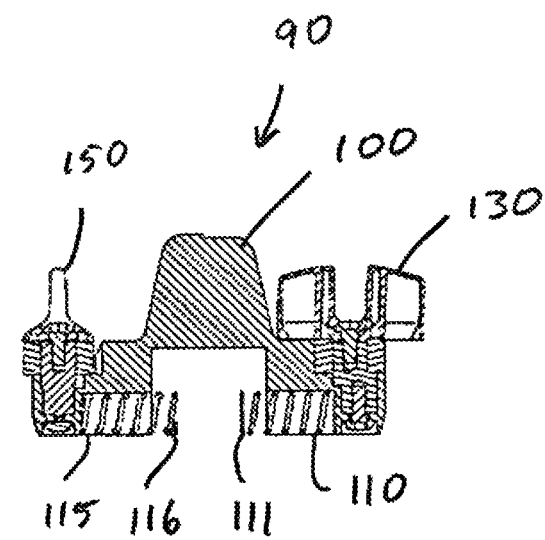
FIG. 28 is a cross-sectional view taken along line 28-28 in FIG. 27.
Figure 29:
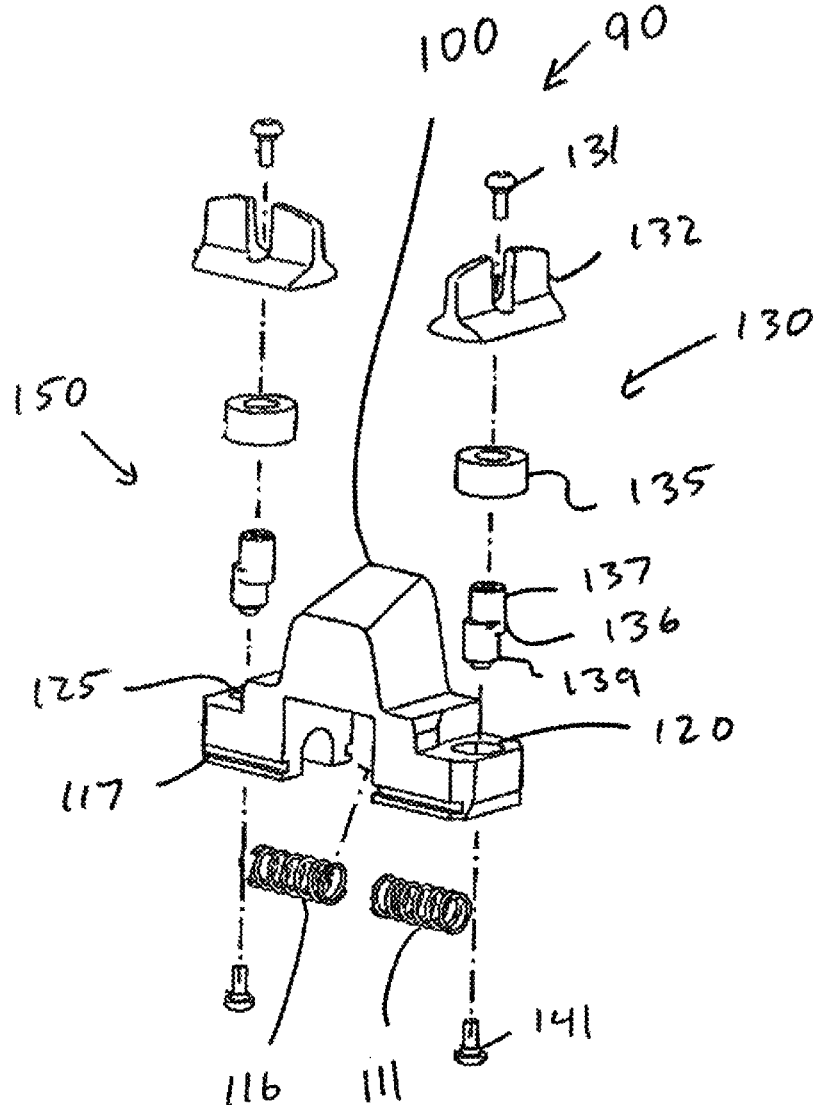
FIG. 29 is an exploded view of the lock assembly shown in FIG. 27.
Figure 30:
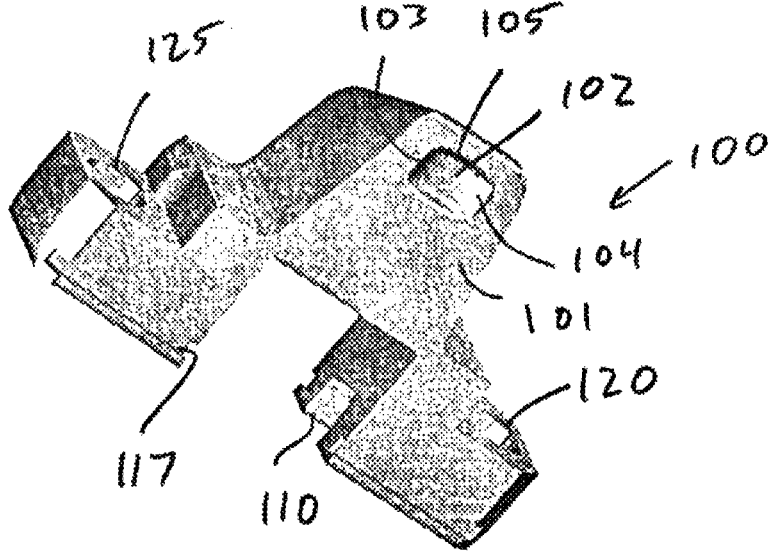
FIG. 30 is a perspective view of a front lock assembly housing.
Figure 31:
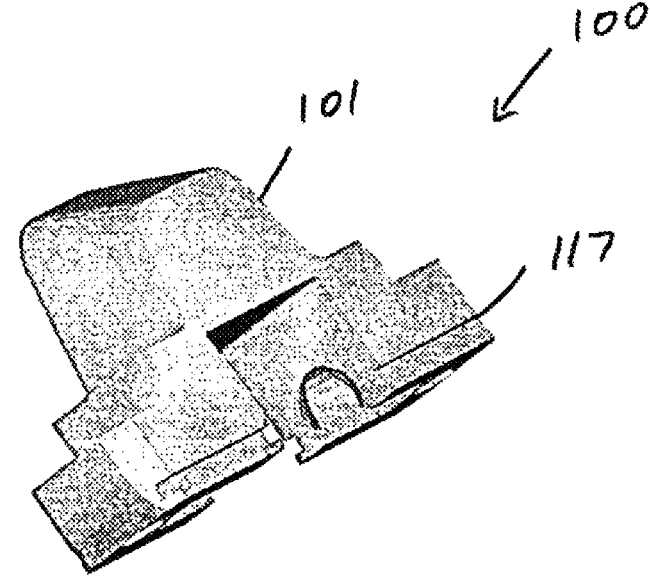
FIG. 31 is an alternative perspective view of the front lock assembly housing.
Figure 40:
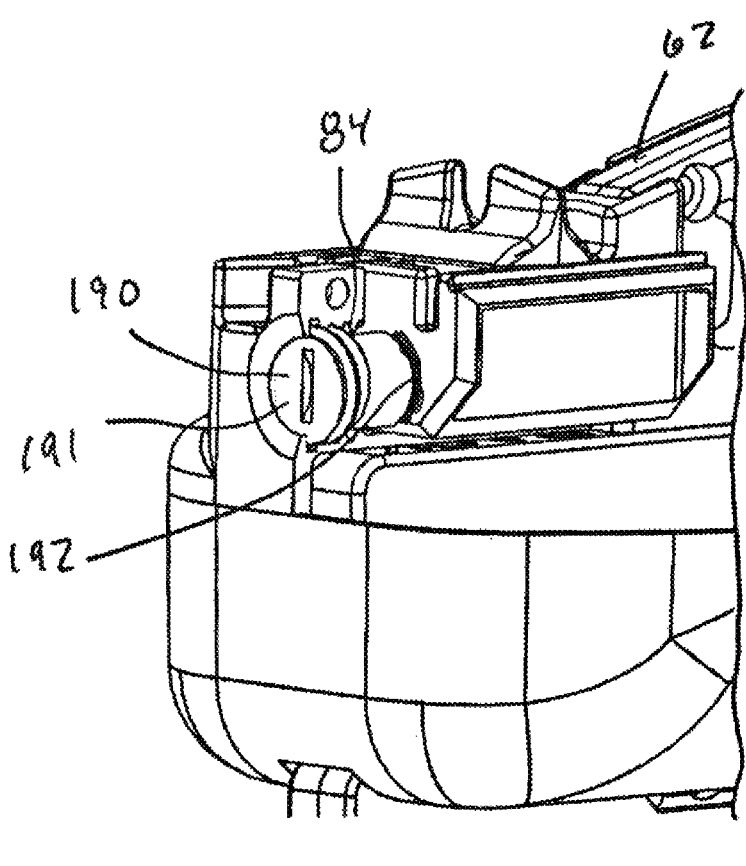
FIG. 40 is a partial close-up view of FIG. 25.
Figure 41:
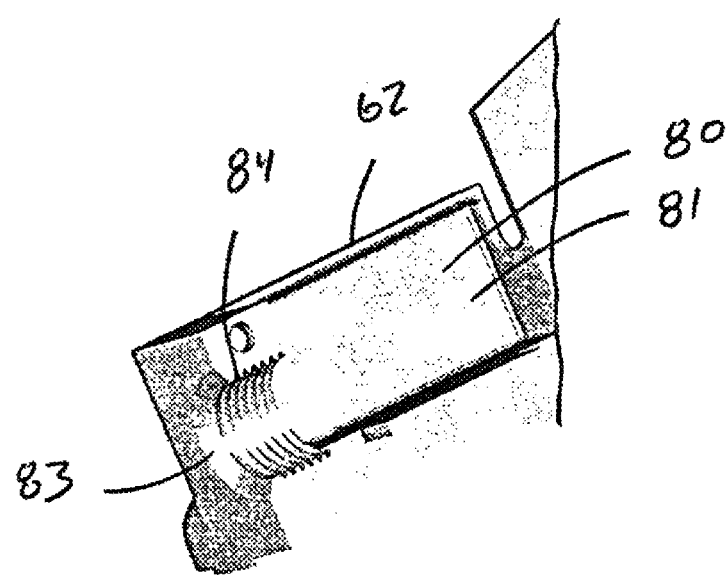
FIG. 41 is a partial perspective view of a rear end of a cap of the body.

The rear lock assembly 170 is received within the cavity 81 of the body 40 at the aft end 42. In particular, there is a gap 82 present between the back of the lock assembly 170 and in inside rear face of the cavity 81. The tensioner cap 191 is engaged with the retainer 84 of the body 40, as seen in FIGS. 25 and 40. The retainer is preferably a spiral retainer (one-half of the retainer is illustrated in FIG. 41). In the regard, rotational movement of the cap 191 relative to the retainer 84 causes the cap to translate (by twisting in or out) to determine the amount of spring force present in spring 195 required to move the lock assembly to shorten the depth of the gap 82. Spring 95 maintains the gap when there is no tension on a line so that the lock assembly is held (biases) to the front of the cavity.

Figure 45:
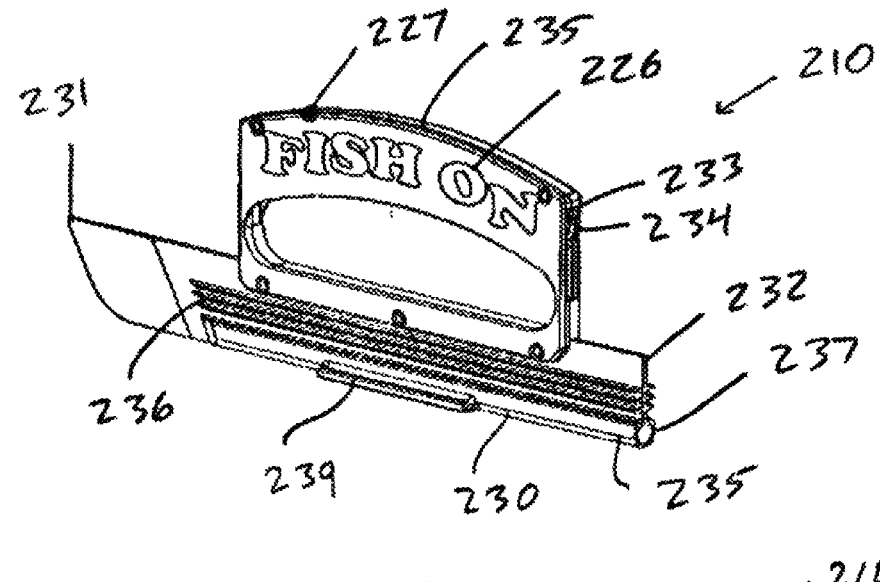
FIG. 45 is a perspective isolation view of the keel assembly.
Figure 46:
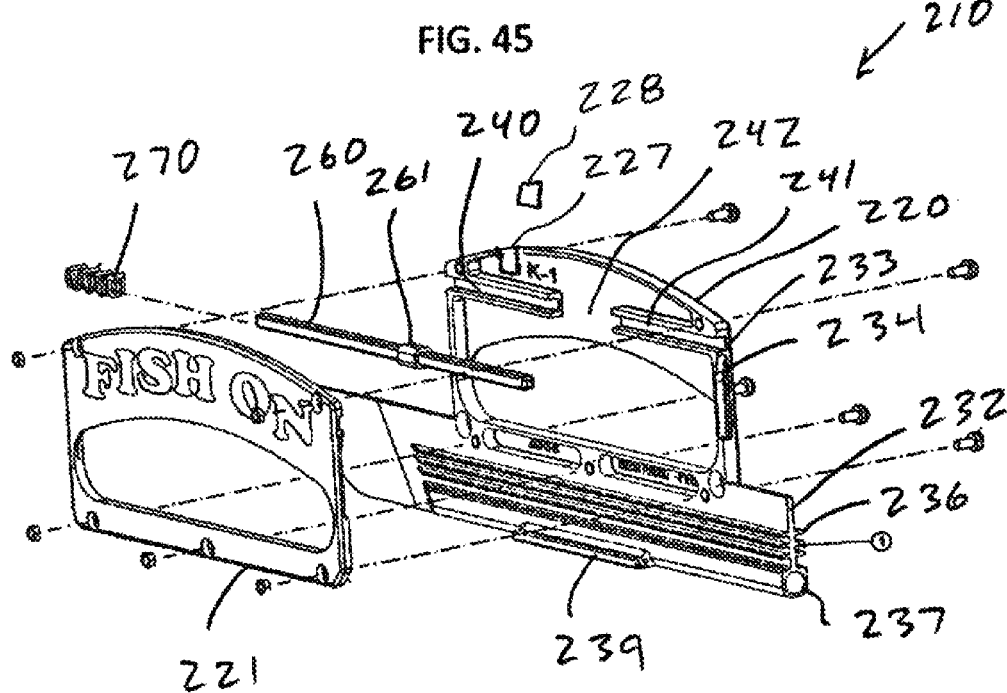
FIG. 46 is an exploded perspective view of the keel assembly.
Figure 47:
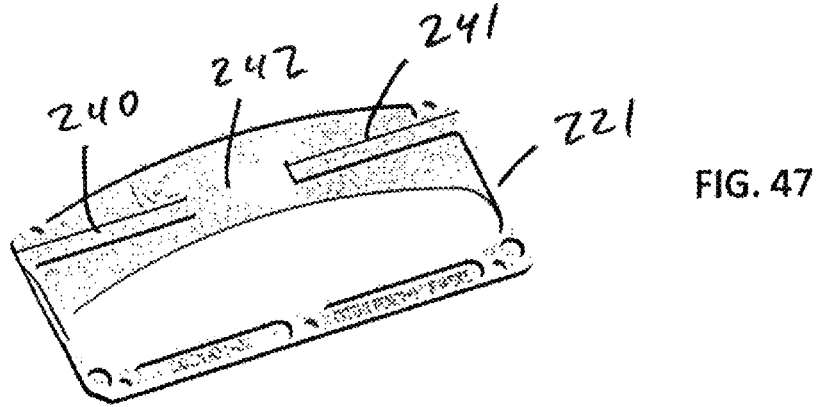
FIG. 47 is a reverse perspective view of a piece of the keel assembly.
Figure 48:
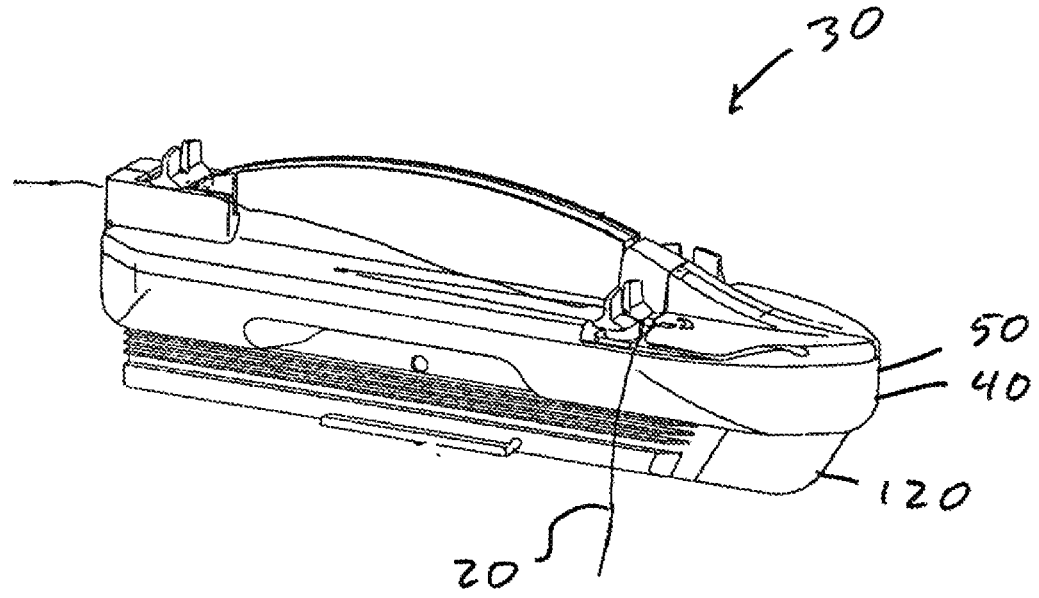
FIG. 48 is a perspective view showing a line locked to both the front lock assembly and rear lock assembly.
Figure 49:
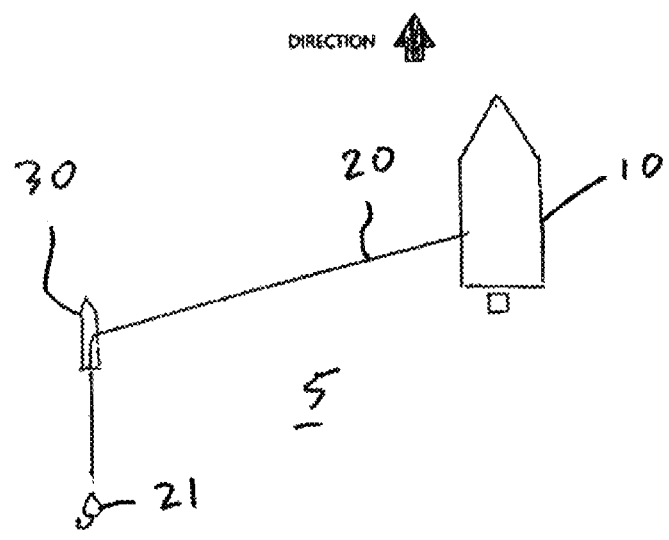
FIG. 49 is a schematic view showing a planer board in position for fishing to the side of a boat.
Figure 50:
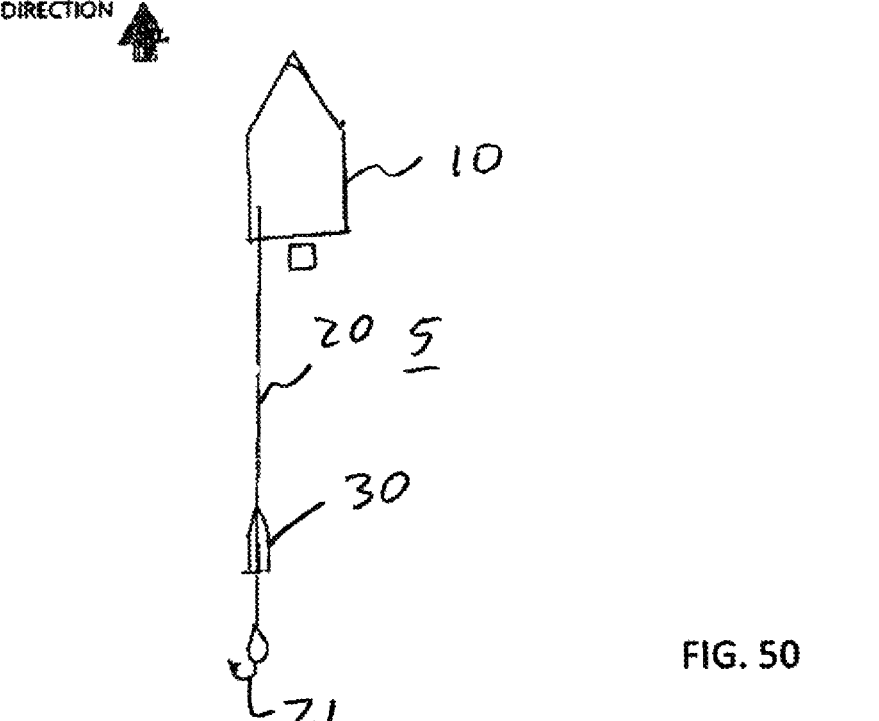
FIG. 50 is a schematic view showing the planer board behind the boat.

A preferred embodiment of a keel assembly 210 is shown in FIGS. 45-47. The keel assembly 210 has a first piece 220 and a second piece 221, which can be joined together. The keel assembly 210 has a top 225 and a bottom 230. The top 225 contains a two-sided sign 226. The top preferably also contains a pocket, or light pocket, 227 for containing a light 228. The light can be selectably turned on and off by the user. The assembly 210 further has a front 231 and a rear 232. The rear 232 has a lip 233 and a ramp 234 below the lip. The ramp 234 is angled or curved (vertically from bottom to top) to the bottom of the lip 233 whereby an item can slide up the ramp 234 and pass over the lip 233. The assembly 210 has a keel 235 with fins 236 and a bottom tube 237. The tube 237 can selectably receive an optional weight 238. The weight 238 can be positioned to any selected position within the tube 237. One preferred method of adjustment is a threadable engagement between the weight and the inside of the tube as seen in FIG. 11. It is appreciated that other methods of adjustment could be used without departing from the broad aspects of the present invention. A grab handle 239 can be at the bottom of the keel. The grab handle can be used to pull the keel to the down position. The assembly 210 further has a front pin retainer 240 and a rear pin retainer 241. The retainers are preferably linearly aligned along a retainer axis. The retainer axis is preferably parallel to the planer board 30 longitudinal axis. A gap 242 is present between the front and rear pin retainers 240 and 241.

The second piece 221 is a cover that can be fastened to the first piece 220 to keep a keel pin 260 within the front and rear pin retainers 240 and 241. The keel pin 260 has a lug 261 that is positioned in the gap 242 between retainers 241 and 242. A keel pin spring 270 is provided and is positioned between the lug 261 and the front pin retainer 240. In this regard, the spring biases the keel pin towards the rear or aft end 42 of the body 40. This force biases the rear end of the keel pin to maintain an abutting engagement with the lock protrusion when the keel assembly is in the down position.

A keel spring 280 is provided to bias the keel to an up position when the keel assembly 210 is released, as described below.

The keel assembly can be positioned to a down or lower position, as best seen in FIGS. 6-13. In the down position, the keel 235 extends below the bottom of the hull or lower piece 50 of the body 40. The fins 236 increase surface area with the water to increase drag. Both the front and rear end of the keel pin 260 are held in place. The front of the keel pin 260 is held in the detent 102 in the front lock assembly 90 (FIGS. 13 and 25). The rear of the keel pin 260 is held against lip 187 of the rear lock assembly 170 and the keel assembly rear lip 233 is held below the lock lip 187 (FIG. 12).

In the low position, the light 228, when selectably illuminated, shines through both the keel assembly 210 and the cap 60. The cap can have a different color than that keel assembly, whereby the light observed by the user will have a first color. In the up position, the sign 226 extends vertically through body opening 52. Light 228, when illuminated, shines through the keel assembly above the cap wherein a second color is observable by the user.

The keel assembly can be released to move from the down position to the up position in two ways.

One way is to overcome the rear lock assembly 170. When a line is locked in the rear lock assembly (either left or right), the keel pin 260 engages the lock protrusion 187 in an abutting manner, and the lip 233 is held below the lock 187. The keel assembly 210 can be released when fishing line 20 tension (such as by a fish on the line) overcomes the tension set by the tensioner 190 (the spring force in the tensioner spring 195 minus the spring force in the keel pin spring 270). When this occurs (i.e., overcoming a threshold force required for release), the rear lock assembly moves to the back of the cavity 81 (closing the gap 82 at least by a distance equal to the height of the protrusion 187) so that the lock protrusion 187 moves rearward allowing the lip 233 to clear the protrusion or lip 187. Then, the keel spring 280 pushes the keel 235 from the lower position to an upper position with the keel 235 in the body.

A second way is to overcome the front lock assembly 90. When a line 20 is locked in the front lock assembly 90 (either line lock 130 or line lock 150), the keel assembly 210 can be released when the fishing line tension (such as by a user pulling the line from the boat) overcomes the threshold force (the spring force in the tensioner spring 195 minus the spring force in the keel pin spring 270). This is accomplished as the line lock assembly is moved left or right (depending on which line lock is used) and the front end of the pin rides against the detent side wall ramps 103 or 104 to escape the detent 102. The pin 260 cannot exit the detent 102 unless it overcomes the threshold force resulting in the keel pin 260 moving rearward with respect to the front and rear pin retainers 240 and 241 to push the lock protrusion 187 (and entire housing 175) rearward closing the gap 82 at least by a distance equal to the height of the protrusion 187. This allows the front end of the pin to be able to clear the detent 102 of the front lock assembly and lip 233 to clear the lock protrusion 187. Keel spring biases the keel upwards to an up position when the keel 235 is released. The up position of the keel is best seen in FIGS. 1-5.

The keel assembly 210 and keel 235 can be easily reset by pushing or pulling the keel assembly to the down position with respect to the body 40. The lock springs 111 and 116 automatically center the front of the keel pin 260 within the detent 102. Also, the lock protrusion 187 will ride up the ramp (displacing the lock 200 rearward when the tensioner force is overcome) so that the keel assembly 210 passes over the lock lip or protrusion 187 to reset the keel assembly lip 233 below lip 187.

Figure 51:
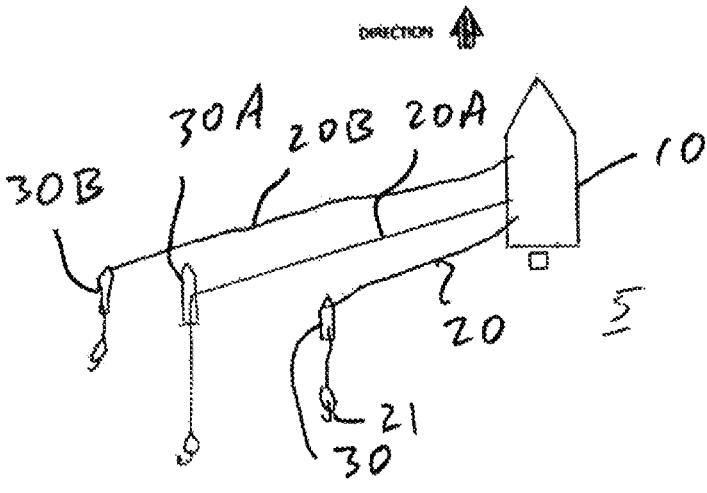
FIG. 51 is a schematic view showing three planer boards in position for fishing to the side of a boat.
Figure 52:
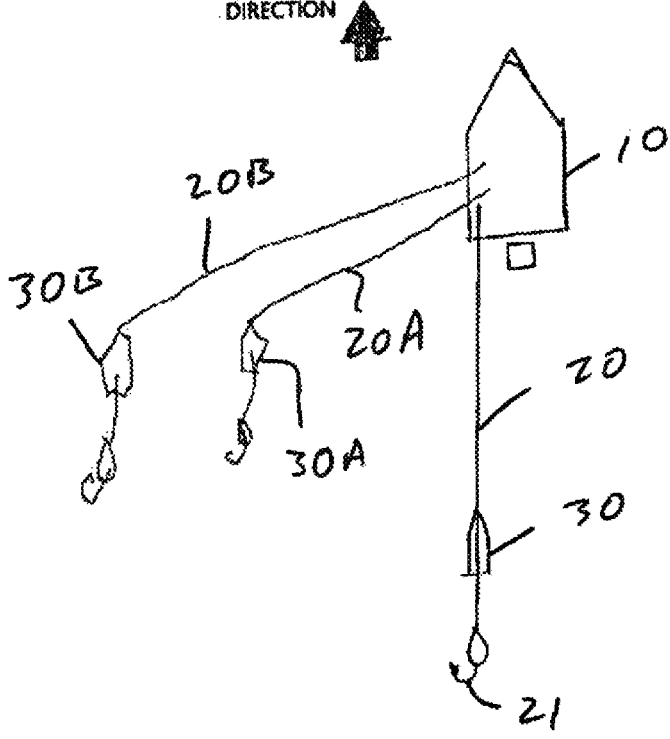
FIG. 52 is similar to FIG. 51, but shows one of the three planer boards behind the boat as the keel is in the up position.

Turning now to FIGS. 48-52, use of the planer board 30 is illustrated. The planer board 30 is schematically shown in a trolling position (FIG. 49) when the keel is in the down position and in the trailing position (FIG. 50) when the keel is in the up position. It is appreciated that when the keel assembly is in the up position, the planer board moves to the back of the boat. FIG. 51 shows three planer boards (30, 30A and 30B) in the trolling position on three respective lines (20, 20A and 20B). FIG. 52 shows two of three planar boards (30A and 30B) in the trolling position and one of three planar boards (30) in the trailing position. It is appreciated that any number of planar boards can be used simultaneously and that boards can be simultaneously used on both sides of the boat 10. It is also appreciated that any of the boards could have the keel raise to the up position and float to behind the boat.

It is appreciated that there are several unique structural features according to various aspects of the present invention. These features can be utilized individually or combined with other features in any possible way, such as being coupled with other features, tripled with other features and/or used all together without departing from the broad aspects of the present invention. For example, each of the following features could be used individually or in any manner of combination:

A planer board for use with a fishing line used to catch a fish, said planer board comprising: a body having a hull; and a keel assembly having a keel, said keel being movable from a first position to a second position with respect to said body, said keel being retracted into said body when said keel assembly is in the second position when the fish provides a force upon the fishing line supported by the planer board in excess of a threshold force.

A planer board comprising: a body; a keel assembly having a keel, said keel assembly being movable between a first position wherein said keel extends below said body and a second position wherein said keel is retracted into said body; a front lock assembly; a rear lock assembly; a keel pin between said front lock assembly and said rear lock assembly; and a keel pin spring.

A planer board for use with a fishing line used to catch a fish, said planer board comprising: a body; a keel assembly being movable between a first position wherein said keel extends below said body and a second position wherein said keel is retracted into said body; a rear lock assembly selectably engaging the fishing line; and a tensioner, said tensioner controlling a threshold force necessary on the fishing line to cause said keel assembly to be released to move from said first position to said second position.

Each of these structures can also be combined with each other and/or with one or more of the following features, if not already recited above: a keel spring, a keel pin and associated keel pin spring, a rear lock assembly, a front lock assembly optionally with two line locks and two centering springs, a tensioner for setting a threshold force, a keel sign, a lightable keel sign, front line slots, a front lock assembly with a detent, a rear lock assembly with a lock lip or protrusion that is engaged by a keel assembly lip to lock the keel assembly in a first position, and a gap between the rear lock assembly and a rear wall of the rear lock assembly housing.

It is further appreciated that there are several unique method features according to the present invention. These features can be utilized individually or combined with other features in any possible way, such as being coupled with other features, tripled with other features and/or used all together without departing from the broad aspects of the present invention.

As seen in FIG. 53, a unique method is a method of using a planer board is provided. A step (S10) is providing a planer board having a body and a keel assembly, wherein the keel assembly is movable between a first position and a second position. The next step (S20) is providing a boat and a line. The next step (S30) is connecting the line and the planer board. The next step (S40) is trolling with the planer board having the keel assembly in the first position. The next step (S50) is having the keel assembly move to the second position when a fish engages the line with a force greater than a threshold force.

This method can be modified and/or combined with one or more of the following methods or steps with respect to providing a planer board: providing a keel spring, providing a keel pin and associated keel pin spring, providing a rear lock assembly, providing a front lock assembly optionally with two line locks and two centering springs, providing a tensioner for setting a threshold force, providing a keel sign, providing a lightable keel sign, providing front line slots, providing a front lock assembly with a detent, providing a rear lock assembly with a lock lip or protrusion that is engaged by a keel assembly lip to lock the keel assembly in a first position, and providing a planer board with a gap between the rear lock assembly and a rear wall of the rear lock assembly housing. Addition steps of use could include any of the following, either alone or in combination: trolling with multiple planer boards, allowing a planer board to move to behind the boat when the keel assembly is in the second position, reeling the planer board in when the keel assembly is in the second position, and resetting the keel assembly to the first position.

Thus, it is apparent that there has been provided, in accordance with the invention, a planer board with movable keel that fully satisfies the objects, aims and advantages as set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A planer board for use with a fishing line used to catch a fish, said planer board comprising:
   a body having a forward end and an aft end, the body further having a hull, the hull having a central tunnel with a tunnel longitudinal axis that is aligned along a planer board longitudinal axis, the planer board longitudinal axis being aligned with the forward end and the aft end, the fishing line being selectively engaged by the body;
   a keel spring;
   a keel assembly having a keel, said keel passing through said central tunnel in a direction perpendicular to the planer board longitudinal axis, said keel being movable from a first position to a second position with respect to said body, said keel being retracted into said body when said keel assembly is in the second position when the fish provides a force upon the fishing line supported by the planer board in excess of a threshold force of a lock assembly wherein said keel spring is allowed to expand between a portion of said body and a portion of said keel to retract said keel into said body,
   wherein the lock assembly is a rear lock assembly, the body further has a rear lock mount at the aft end, the rear lock assembly is received in said rear lock mount, and the keel spring has a keel spring force that is perpendicular to the threshold force.

2. The planer board of claim 1 wherein the body further has a front lock mount, and the planer board further comprising a front lock assembly received in said front lock mount.

3. The planer board of claim 2 wherein said front lock assembly comprises a first line lock and a second line lock.

4. The planer board of claim 3 further comprising a first centering spring and a second centering spring, said first centering spring being received within a first spring pocket of said front lock assembly, said second centering spring being received within a second spring pocket of said front lock assembly, said first centering spring and said second centering spring being on opposite sides of said central tunnel, said first centering spring and said second centering spring biasing said front lock assembly to a centered position with respect to said body.

5. The planer board of claim 2 further comprising a keel pin and a keel pin spring, said keel pin having a keel pin lug, said keel having a front pin retainer, said keel pin being between said rear lock assembly and said front lock assembly, and said keel pin spring being between said keel pin lug and said front pin retainer.

6. The planer board of claim 5, wherein said keel pin has a front, and said front lock assembly has a detent, said front of said keel pin being received within said detent when said keel assembly is in said first position.

7. The planer board of claim 1, wherein:
   said rear lock assembly has a rear lock assembly lip; and
   said keel assembly has a rear keel assembly lip, said rear keel assembly lip clearing said rear lock assembly lip as said keel assembly moves from said first position to said second position.

8. The planer board of claim 1 further comprising a tensioner, said tensioner received within said rear lock assembly, said tensioner setting said threshold force.

9. The planer board of claim 1, wherein said keel assembly has a sign, said sign being concealed when said keel assembly is in said first position and is deployed when said keel assembly is in said second position.

10. A planer board for use with a fishing line used to catch a fish, said planer board comprising:
   a body having a forward end and an aft end, the body further comprising a hull with a central tunnel having a central tunnel opening, said body further comprising a rear lock mount, the rear lock mount being at the aft end, and the central tunnel having a central tunnel longitudinal axis between the forward end and the aft end;
   a keel assembly being movable by a keel spring between a first position wherein said keel extends below said body and a second position wherein said keel is retracted into said body, said keel assembly passing through said central tunnel opening in a direction perpendicular to the central tunnel longitudinal axis;
   a rear lock assembly received in said rear lock mount and selectably engaging the fishing line; and
   a tensioner, said tensioner being an adjustable tension that is received within said rear lock assembly, said tensioner controlling a threshold force necessary on the fishing line to cause said keel assembly to be released to move from said first position to said second position by said keel spring.

11. The planer board of claim 10 further comprising:
   a front lock assembly;
   a keel pin between said front lock assembly and said rear lock assembly; and
   a keel pin spring,
   wherein the body further comprises a front lock mount and the front lock assembly is received in the front lock mount,
   wherein said keel pin has a keel pin lug, said keel has a front pin retainer and said keel pin spring is between said keel pin lug and said front pin retainer.

12. The planer board of claim 11, wherein said front lock assembly comprises:

a housing with a first pocket, a second pocket, a first spring pocket and a second spring pocket, said first spring pocket and said second spring pocket being on opposite sides of said central tunnel;

a first line lock received within said first pocket;

a second line lock received within said second pocket;

a first spring received within said first spring pocket; and a second spring received within said second spring pocket, said first spring and said second spring biasing said first line lock and said second line lock to be symmetrically located about a middle of said body.

13. The planer board of claim 11, wherein:

said keel assembly has a keel assembly lip;

said rear lock assembly has a rear lock assembly lip;

said front lock assembly has a detent;

in said first position, said keel assembly lip is engaged by said rear lock assembly lip, and said keel pin is within said detent.

14. A planer board comprising:

a body having a hull with a central tunnel having a central tunnel opening, the body further having a front lock mount and a rear lock mount;

a keel assembly having a keel, said keel assembly passing through said central tunnel opening, said keel assembly being movable between a first position wherein said keel extends below said body and a second position wherein said keel is retracted into said body, said keel assembly further comprising a front pin retainer, said keel assembly further having a keel assembly lip;

a front lock assembly received in said front lock mount, said front lock assembly having a detent;

a rear lock assembly received in said rear lock mount, said rear lock assembly having a rear lock assembly lip;

a keel pin between said front lock assembly and said rear lock assembly, said keel pin having a lug; and a keel pin spring being between said keel pin lug and said front pin retainer, wherein in said first position, said keel assembly lip is engaged by said rear lock assembly lip, and said keel pin is within said detent.

15. A planer board comprising:

a body having a forward end and an aft end, the body further having a hull with a central tunnel having a central tunnel opening, the body further having a front lock mount and a rear lock mount, the rear lock mount being at the aft end, and the central tunnel having a central tunnel longitudinal axis between the forward end and the aft end;

a keel assembly having a keel, said keel assembly passing through said central tunnel opening, said keel assembly being movable in a direction perpendicular to the central tunnel longitudinal axis between a first position wherein said keel extends below said body and a second position wherein said keel is retracted into said body, said keel assembly further comprising a front pin retainer;

a front lock assembly received in said front lock mount;

a rear lock assembly received in said rear lock mount;

a keel pin between said front lock assembly and said rear lock assembly, said keel pin having a lug;

a keel pin spring being between said keel pin lug and said front pin retainer; and a tensioner, said tensioner being received within said rear lock assembly setting a threshold force, wherein either of said front lock assembly and said rear lock assembly unlocks said keel assembly when subjected to a force greater than said threshold force.

16. A planer board comprising:

a body having a forward end and an aft end, the body further having a hull with a central tunnel having a central tunnel opening, the body further having a front lock mount and a rear lock mount, the rear lock mount being at the aft end and the front lock mount being forward of the rear lock mount, the central tunnel having a central tunnel longitudinal axis between the forward end and the aft end;

a keel assembly having a keel, said keel assembly passing through said central tunnel opening in a direction perpendicular to the central tunnel longitudinal axis, said keel assembly being movable between a first position wherein said keel extends below said body and a second position wherein said keel is retracted into said body, said keel assembly further comprising a front pin retainer;

a front lock assembly received in said front lock mount;

a rear lock assembly received in said rear lock mount;

a keel pin between said front lock assembly and said rear lock assembly, the keel pin being parallel to the central tunnel longitudinal axis, said keel pin having a lug;

a keel pin spring being between said keel pin lug and said front pin retainer; and a keel spring, said keel spring being located between a portion of said body and a portion of said keel assembly, and said keel spring biasing said keel assembly towards said second position.

17. The planer board of claim 16, further comprising a tensioner, said tensioner setting a threshold force, wherein either of said front lock assembly or said rear lock assembly unlocks said keel assembly when subjected to a force greater than said threshold force.

18. The planer board of claim 16, wherein said front lock assembly comprises:

a housing with a first pocket, a second pocket, a first spring pocket and a second spring pocket, said first spring pocket and said second spring pocket being on opposite sides of said central tunnel;

a first line lock received within said first pocket;

a second line lock received within said second pocket;

a first spring received within said first spring pocket; and a second spring received within said second spring pocket, wherein said first spring and said second spring biasing said first line lock and said second line lock to be symmetrically located about a middle of said body.

19. The planer board of any claim 16, wherein:

said keel assembly has a keel assembly lip;

said rear lock assembly has a rear lock assembly lip;

said front lock assembly has a detent;

in said first position, said keel assembly lip is engaged by said rear lock assembly lip, and said keel pin is within said detent.

20. A planer board for use with a fishing line used to catch a fish, said planer board comprising:

a body having a hull, the hull having a central tunnel, the body selectably engaging the fishing line, the body further having a rear lock mount;

a rear lock assembly received within said rear lock mount, said rear lock assembly having a rear lock assembly lip;

a keel spring;

a keel assembly having a keel, said keel passing through said central tunnel, said keel being movable from a first position to a second position with respect to said body, said keel being retracted into said body when said keel assembly is in the second position when the fish provides a force upon the fishing line supported by the planer board in excess of a threshold force, said keel spring being expandable between a portion of said body and a portion of said keel to retract said keel into said body, wherein:

said keel assembly has a rear keel assembly lip, said rear keel assembly lip clearing said rear lock assembly lip as said keel assembly moves from said first position to said second position, and said keel pin has a front, and said front lock assembly has a detent, said front of said keel pin being received within said detent when said keel assembly is in said first position.

21. A planer board for use with a fishing line used to catch a fish, said planer board comprising:

a body having a hull, the hull having a central tunnel, the body selectably engaging the fishing line, the body further having a rear lock mount and a front lock mount;

a rear lock assembly received in said rear lock mount;

a front lock assembly received in said front lock mount, said front lock assembly further comprising a first line lock, a second line lock, a first centering spring received in a first spring pocket, a second centering spring received in a second spring pocket, said first centering spring and said second centering spring being on opposite sides of said central tunnel, said first centering spring and said second centering spring biasing said front lock assembly to a centered position with respect to said body;

a keel spring; and a keel assembly having a keel, said keel passing through said central tunnel, said keel being movable from a first position to a second position with respect to said body, said keel being retracted into said body when said keel assembly is in the second position when the fish provides a force upon the fishing line supported by the planer board in excess of a threshold force, said keel spring being expandable between a portion of said body and a portion of said keel to retract said keel into said body.

22. A planer board for use with a fishing line used to catch a fish, said planer board comprising:

a body comprising a hull with a central tunnel having a central tunnel opening, said body further comprising a rear lock mount;

a keel assembly being movable by a keel spring between a first position wherein said keel extends below said body and a second position wherein said keel is retracted into said body, said keel assembly passing through said central tunnel opening, said keel assembly having a keel assembly lip;

a rear lock assembly received in said rear lock mount and selectably engaging the fishing line, said rear lock assembly having a rear lock assembly lip;

a tensioner received within said rear lock assembly, said tensioner controlling a threshold force necessary on the fishing line to cause said keel assembly to be released to move from said first position to said second position;

a front lock assembly, said front lock assembly having a detent;

a keel pin between said front lock assembly and said rear lock assembly; and a keel pin spring, wherein the body further comprises a front lock mount and the front lock assembly is received in the front lock mount, wherein:

said keel pin has a keel pin lug, said keel has a front pin retainer and said keel pin spring is between said keel pin lug and said front pin retainer, and in said first position, said keel assembly lip is engaged by said rear lock assembly lip, and said keel pin is within said detent.

23. A planer board comprising:

a body having a hull with a central tunnel having a central tunnel opening, the body further having a front lock mount and a rear lock mount;

a keel assembly having a keel, said keel assembly passing through said central tunnel opening, said keel assembly being movable between a first position wherein said keel extends below said body and a second position wherein said keel is retracted into said body, said keel further comprising a front pin retainer;

a front lock assembly received in said front lock mount, said front lock assembly comprising:

a housing with a first pocket, a second pocket, a first spring pocket and a second spring pocket, said first spring pocket and said second spring pocket being on opposite sides of said central tunnel;

a first line lock received within said first pocket;

a second line lock received within said second pocket;

a first spring received within said first spring pocket; and a second spring received within said second spring pocket, wherein said first spring and said second spring biasing said first line lock and said second line lock to be symmetrically located about a middle of said body;

a rear lock assembly received in said rear lock mount;

a keel pin between said front lock assembly and said rear lock assembly, said keel pin having a lug; and a keel pin spring being between said keel pin lug and said front pin retainer; and a keel spring, said keel spring being located between a portion of said body and a portion of said keel assembly, and said keel spring biasing said keel assembly towards said second position.

24. A planer board for use with a fishing line used to catch a fish, said planer board comprising:

a body comprising a hull with a central tunnel having a central tunnel opening, said body further comprising a rear lock mount;

a keel assembly being movable by a keel spring between a first position wherein said keel extends below said body and a second position wherein said keel is retracted into said body, said keel assembly passing through said central tunnel opening;

a rear lock assembly received in said rear lock mount and selectably engaging the fishing line;

a tensioner received within said rear lock assembly, said tensioner controlling a threshold force necessary on the fishing line to cause said keel assembly to be released to move from said first position to said second position;

a front lock assembly, said front lock assembly comprising:

a housing with a first pocket, a second pocket, a first spring pocket and a second spring pocket, said first spring pocket and said second spring pocket being on opposite sides of said central tunnel;

a first line lock received within said first pocket;

a second line lock received within said second pocket;

a first spring received within said first spring pocket; and a second spring received within said second spring pocket, wherein said first spring and said second spring biasing said first line lock and said second line lock to be symmetrically located about a middle of said body;

a keel pin between said front lock assembly and said rear lock assembly; and a keel pin spring, wherein the body further comprises a front lock mount and the front lock assembly is received in the front lock mount, wherein said keel pin has a keel pin lug, said keel has a front pin retainer and said keel pin spring is between said keel pin lug and said front pin retainer.

\* \* \* \* \*